United States Patent
Khuu

(10) Patent No.: US 9,610,965 B2
(45) Date of Patent: Apr. 4, 2017

(54) MULTIPLE FREQUENCY BAND BRAKING APPARATUS WITH CLUTCH

(71) Applicant: Carttronics, LLC, San Diego, CA (US)

(72) Inventor: Thomas K. Khuu, San Diego, CA (US)

(73) Assignee: Carttronics, LLC., San Diego, CA (US)

( * ) Notice: Subject to any disclaimer, the term of this patent is extended or adjusted under 35 U.S.C. 154(b) by 0 days.

(21) Appl. No.: 15/227,671

(22) Filed: Aug. 3, 2016

(65) Prior Publication Data

US 2016/0339939 A1 Nov. 24, 2016

Related U.S. Application Data

(63) Continuation of application No. 14/661,920, filed on Mar. 18, 2015, now Pat. No. 9,409,443, which is a continuation of application No. 14/079,931, filed on Nov. 14, 2013, now Pat. No. 8,985,282, which is a continuation of application No. 13/034,292, filed on Feb. 24, 2011, now Pat. No. 8,602,176.

(51) Int. Cl.
| | |
|---|---|
| B62B 5/04 | (2006.01) |
| B60B 33/00 | (2006.01) |
| F16D 65/16 | (2006.01) |
| F16D 63/00 | (2006.01) |
| F16D 121/24 | (2012.01) |

(52) U.S. Cl.
CPC ........ B62B 5/0423 (2013.01); B60B 33/0086 (2013.01); B60B 33/0092 (2013.01); B60B 33/0094 (2013.01); F16D 65/16 (2013.01); *B62B 2301/00* (2013.01); *F16D 63/006* (2013.01); *F16D 2121/24* (2013.01)

(58) Field of Classification Search
CPC . B60B 33/0084; B60B 33/0028; F16D 65/16; F16D 65/21; B62B 5/0423; B60R 25/09; B60R 25/104
USPC .... 188/1.12, 19, 82.34, 82.74, 82.77, 82.84; 280/33.994; 16/35 R
See application file for complete search history.

(56) References Cited

U.S. PATENT DOCUMENTS

| | | | | |
|---|---|---|---|---|
| 2,504,571 | A * | 4/1950 | Noguera | D01H 1/22 188/82.84 |
| 4,577,880 | A * | 3/1986 | Bianco | B62B 5/0423 188/1.12 |
| 5,040,641 | A * | 8/1991 | Phillips | B60B 33/0028 16/35 R |
| 7,562,729 | B2 * | 7/2009 | Hammerle | B60R 25/00 180/65.1 |
| 8,602,176 | B2 * | 12/2013 | Khuu | B60B 33/0068 188/1.12 |
| 8,985,282 | B2 * | 3/2015 | Khuu | B60B 33/0068 188/19 |
| 9,409,443 | B2 * | 8/2016 | Khuu | B60B 33/0068 |

(Continued)

*Primary Examiner* — Christopher Schwartz
(74) *Attorney, Agent, or Firm* — Gavrilovich, Dodd & Lindsey LLP; Charles D. Gavrilovich, Jr.

(57) ABSTRACT

A shopping cart wheel includes a braking apparatus, clutch mechanism and electronics that control the braking apparatus in response to wireless signals. The wireless signals include low frequency electromagnetic signals within a low frequency band and high frequency signals within a high frequency band.

20 Claims, 20 Drawing Sheets

(56) References Cited

U.S. PATENT DOCUMENTS

| | | | |
|---|---|---|---|
| 2005/0155824 A1* | 7/2005 | Taba | B60R 25/09 188/19 |
| 2006/0163350 A1* | 7/2006 | Melton | G06K 7/10336 235/435 |
| 2007/0023126 A1* | 2/2007 | Sollers | B62B 3/108 156/104 |
| 2011/0036671 A1* | 2/2011 | McKay | B60T 1/04 188/69 |

* cited by examiner

MULTIPLE FREQUENCY BAND BRAKING APPARATUS WITH CLUTCH

RELATED APPLICATIONS

This application is a continuation of U.S. application Ser. No. 14/661,920, filed Mar. 18, 2015, now U.S. Pat. No. 9,409,443 which is a continuation of U.S. application Ser. No. 14/079,931, filed Nov. 14, 2013, now U.S. Pat. No. 8,985,282 which is a continuation of U.S. application Ser. No. 13/034,292, filed on Feb. 24, 2011, now U.S. Pat. No. 8,602,176, which are incorporated by reference in their entirety, herein.

FIELD

This invention generally relates to brakes and more particularly to a ball bearing braking mechanism.

BACKGROUND

Braking mechanisms are used to stop rotation of a rotating component where the rotating component may be part of machinery or a wheel. Brakes, for example, are used to stop or restrict motion of a vehicle by restricting rotation of a wheel of the vehicle. One use for brakes includes providing a mechanism for restricting motion of a shopping cart or dolly to reduce theft or other unauthorized movement of the shopping cart.

DETAILED DESCRIPTION

Figure 1A:
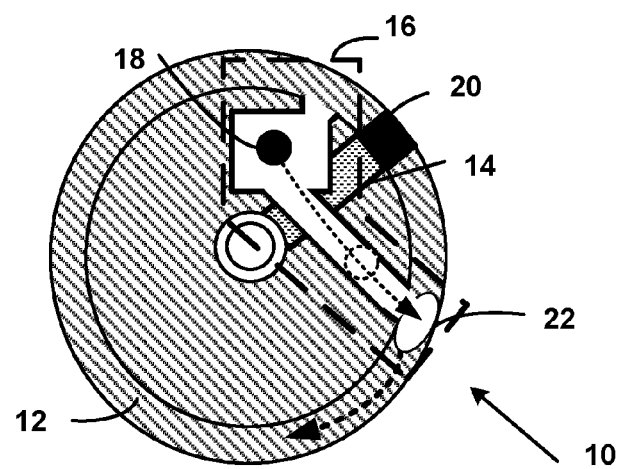
FIG. 1A is a block diagram of a braking mechanism for restricting rotation of a rotating component before a moveable interposer is moved to a braking position in accordance with first exemplary embodiments.

Braking systems on shopping carts can be used to reduce theft by wirelessly activating a brake on a particular shopping cart to restrict motion of the shopping cart. The brake is engaged and disengaged in response to wireless signals that may be transmitted from particular locations in a shopping area or building. When a cart passes near those locations under certain conditions, the brake is activated. For example, if an attempt is made to remove a cart from a store and the braking system has not been notified that exit from the store is authorized, the brake is activated when passing through the store exit where a wireless transmitter transmits a wireless signal. Conventional braking mechanisms for shopping carts and other vehicles, however, are limited in that they are often large and difficult and/or expensive to attach to existing vehicle designs. The large size may cause the cart to be difficult to maneuver. Further, many conventional systems include parts that are susceptible to wear and must be replaced or repaired which may add significant costs to maintaining the anti-theft system. In addition, conventional designs often require numerous moving parts resulting in increased cost and less reliability.

These limitations and others are reduced or eliminated by the embodiments of the invention discussed below. For example, the use of brake shoes or other friction devices for use as the primary mechanism for restricting rotation of the wheel are eliminated. In the exemplary embodiment, the braking actuator does not participate in the mechanical braking action and will not suffer from feedback wear. This independence facilitates recovery of non-consumable components such as the electronics for reuse, recycling, or proper disposal. Further, at least one of the embodiments may easily be integrated with standard wheels with minimal modifications to the standard wheel. As a result, cost is reduced due to economies of scale. Preventative maintenance and associated costs are reduced with the integration into a standard wheel form factor since the end user is able to perform routine servicing as well as installation without specialized training or tools. For example, the wheel hub and attached tread (tire) could be replaced by detaching the non-rotating parts and remounting them onto a new wheel hub. In addition, the number of moving parts can be significantly reduced from the numbers of conventional systems. This permits the fundamental design to be more scalable for all casters types and wheel sizes, as well as providing the braking force required for a given application. In addition, sensitivity to temperature and degradation from nonuse are minimized.

In some examples, a wheel braking apparatus includes components that inhibit the rotation of a wheel when a ball bearing is placed in a braking position between a bearing wall of a non-rotating component and a bearing barrier of a hub interface component that is at least resistively connected to a hub of the wheel. In response to a wireless signal, the ball bearing is released from a non-braking position and allowed to travel to a braking position between a bearing barrier of one side of a bearing groove and the bearing wall of the non-rotating component. In the braking position, therefore, the ball bearing is interposed, or otherwise lodged, between the bearing wall of the non-rotating component and one side of the bearing grove of the hub interface component. As discussed below, rotation of the wheel may be required to allow the ball bearing to enter the bearing groove in some embodiments. Further wheel rotation may be needed once the ball bearing is within the bearing groove in order for the bearing groove to rotate relative to the ball bearing wall to place the ball bearing in the braking position between the bearing wall and the bearing barrier. In the examples discussed below, the hub interface component includes several recessed features on the outer surface of the hub interface component that interface to protruding features on the inside of the wheel hub. When the bearing is in the braking position, the hub interface component moves relative to the wheel hub only when a torque threshold is exceeded and the recessed features can be moved relative to the protruding features extending into the recessed features. Typically, the relative rotation of the hub interface component to the wheel hub is stopped when each recessed feature reaches the next adjacent protruding feature. Such a mechanism reduces "flat-spotting" where abrasion of the tire occurs in one contact area or "spot" of the wheel surface when the braked wheel is dragged along the ground.

The invention may be implemented using various techniques and components in numerous and diverse embodiments. In addition to a discussion of the general operation and structure of the several embodiments, the disclosure includes a description of embodiments that at least partially utilize gravity to move a movable interposer to the braking position and embodiments that at least partially use magnetic force to move the moveable interposer to the non-braking position. As discussed herein, the first exemplary embodiments refer to one or more examples where the movement of the moveable interposer to the braking position is at least partially due to gravity. The second exemplary embodiments refer to one or more examples where movement of the moveable interposer to the non-braking position is at least partially due to magnetic force.

Figure 1B:
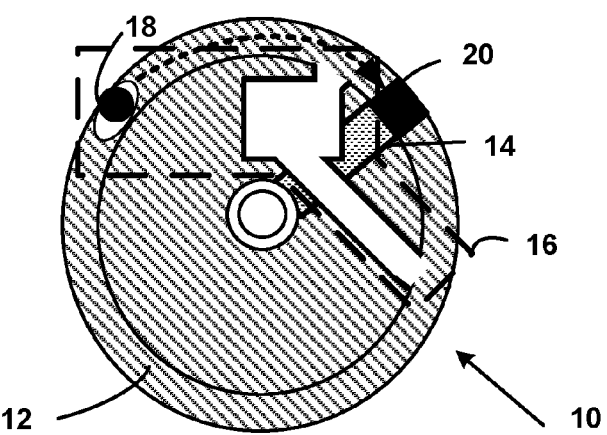
FIG. 1B is a block diagram of the braking mechanism where the moveable interposer is moved toward the non-rotating component feature as the rotating component rotates in accordance with the first exemplary embodiments.
Figure 1C:
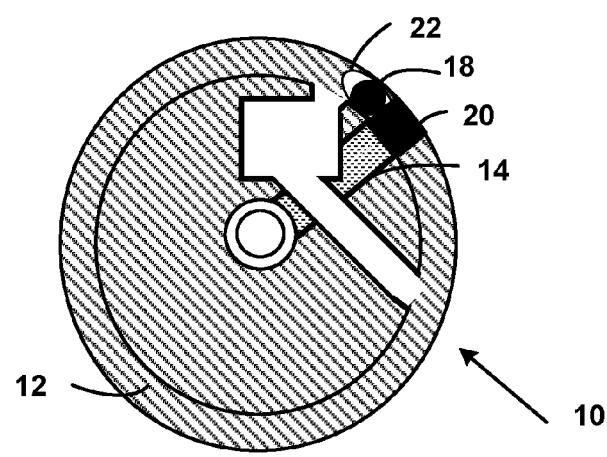
FIG. 1C is a block diagram of a braking mechanism in the braking configuration when the moveable interposer is positioned between the non-rotating component feature and the rotating component feature in accordance with the first exemplary embodiments.
Figure 1D:
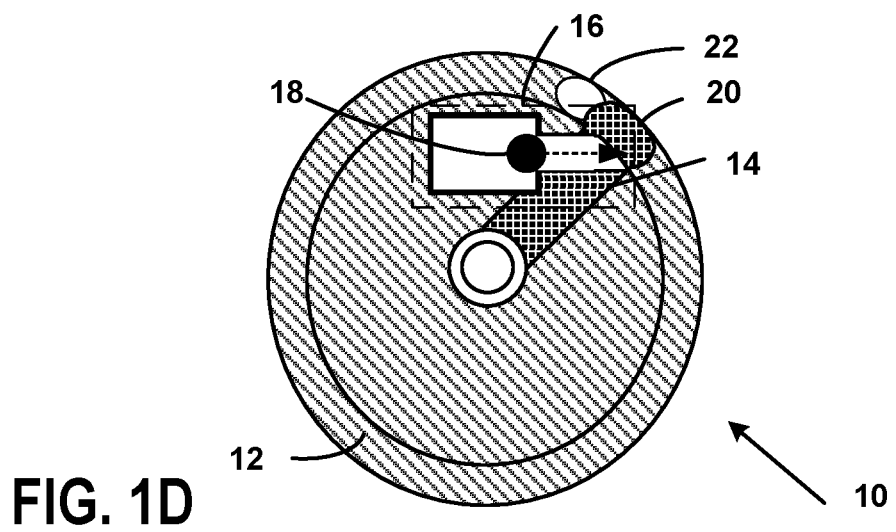
FIG. 1D is a block diagram of the braking mechanism where the moveable interposer is moved to the braking position by a mechanical actuator and slight rotation of the rotating component in accordance with second exemplary embodiments.

FIG. 1A, FIG. 1B, FIG. 1C and FIG. 1D are block diagrams of a braking mechanism 10 for restricting rotation of a rotating component 12 where FIG. 1A FIG. 1B and FIG. 1C are in accordance with the first exemplary embodiments and FIG. 1D is in accordance with the second exemplary embodiments. Although significant advantages may be realized when the braking mechanism techniques are implemented with a braking apparatus for a wheel, the braking mechanism 10 may be used in any of numerous machines and applications. The discussion with reference to FIG. 1A, FIG. 1B, FIG. 1C and FIG. 1D provides a description of the general structure and principles that can be used to implement a braking mechanism within various environments. Accordingly, the rotating component 12 is any wheel, disc, hub, axle or other structure that rotates relative to a non-rotating component 14, where the non-rotating component 14 is any device or structure that is stationary from a point of reference relative to the rotating component 12. The components 12, 14 may be part of a clutch, brake, or other assembly.

To invoke braking, an interposer controller 16 interposes, or otherwise lodges, a movable interposer 18 between a non-rotating component feature 20 and a rotating component feature 22 to restrict rotation of the rotating component 12 relative to the non-rotating component 14. The features 20, 22 on the non-rotating component 14 and the rotating component 12 may be any protrusion, recess, attached element, or other structure that does not allow the rotating component feature 22 to travel past the non-rotating component feature 20 when the moveable interposer 18 is positioned between the two features 20, 22. In the examples discussed below, the moveable interposer 18 is a ball bearing, the rotating component feature 22 is a groove, and the non-rotating component feature 20 is a protrusion forming a bearing wall. Other types of moveable interposers, rotating components features, and non-rotating component features can be used.

The interposer controller 16 is any combination of mechanical and/or electrical components that can move the moveable interposer 18 into the braking position between the features 20, 22. For the examples discussed below, the interposer controller 16 includes a mechanical actuator responsive to electronics to release a ball bearing into a groove that holds and carries the ball bearing as the rotating component 12 rotates until the ball bearing is interposed between a side of the groove and the protrusion forming the non-rotating component feature. The mechanical actuator may include any combination of electric motors, solenoids, magnets, scissor arms, rotating springs, springs, mechanical arms and/or guides. Accordingly, the interposer controller 16 may use a combination of mechanical force from a mechanical actuator, rotational motion of the rotating component 12, magnetic force, and/or gravity to place the moveable interposer 18 in the braking position between the rotating component feature 20 and the non-rotating component feature 22 depending on the particular implementation.

FIG. 1A is an illustration of the braking mechanism 10 in the non-braking configuration before the moveable interposer 18 is moved to the braking position. The dashed line indicates the movement of the moveable interposer 18 after the interposer controller 16 initiates the braking process. The moveable interposer 18 travels to the rotating component feature 22 at least partially in response to gravity. In FIG. 1B, the moveable interposer 18 is moved toward the non-rotating component feature 10 as the rotating component 12 rotates. FIG. 1C is an illustration of the braking mechanism 10 in the braking configuration when the moveable interposer is positioned between the non-rotating component feature 20 and the rotating component feature 22. The rotating component 12 cannot rotate past the non-rotating component 14 in this configuration. In some situations, rotation is possible in the reverse direction until the moveable interposer 18 is again positioned between the two features 20, 22.

To release the braking mechanism 10 from the braking configuration, the interposer controller 16 is reconfigured to allow the moveable interposer 18 to move to a position that allows the two features 20, 22 to rotate past each other. In some cases, reverse rotation of the rotating component may be required to move the moveable interposer 18 from the braking position.

FIG. 1D is a block diagram of the braking mechanism 10 where the moveable interposer is moved to the braking position by a mechanical actuator and slight rotation of the rotating component. As discussed below, one implementation of the exemplary braking mechanism of FIG. 1D includes an interposer controller 16 that has a mechanical actuator that places a magnetic ball bearing between the two features 20, 22. As the rotating component rotates relative to the non-rotating component 14, the ball bearing becomes lodged between the non-rotating component feature 20 and the rotating component feature 22. To place the braking mechanism 10 in the non-braking configuration, the mechanical actuator is retracted such that the moveable interposer is removed from between the two features 20, 22. For the example, movement of the moveable interposer is at least partially due to magnetic force. Where the moveable interposer is a magnetic ball bearing, retracting a magnetically attractive component into a recessed position allows the ball bearing to be attracted to the magnetically attractive component and be withdrawn from the braking position between the two features.

For the examples discussed below, the interposer controller is controlled, at least partially, by wireless signals. The braking mechanism 10, however, may be controlled by other techniques. The braking mechanism may respond to inputs through user controls connected to the controller through wires, for example. In addition, actions by the braking mechanism 10 may be in response to time, speed of rotation, or other events or circumstances.

Figure 1E:
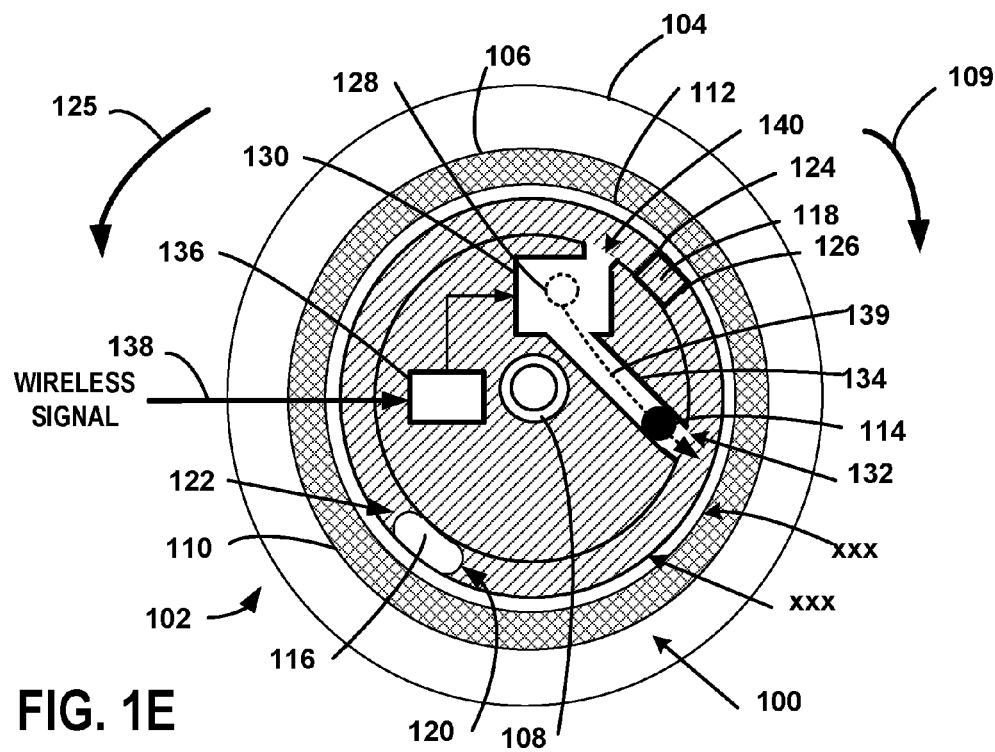
FIG. 1E is a block diagram of a wheel braking apparatus connected to a wheel after the braking apparatus is placed in the braking configuration and the ball bearing has been released in accordance with the second exemplary embodiments.
Figure 1F:
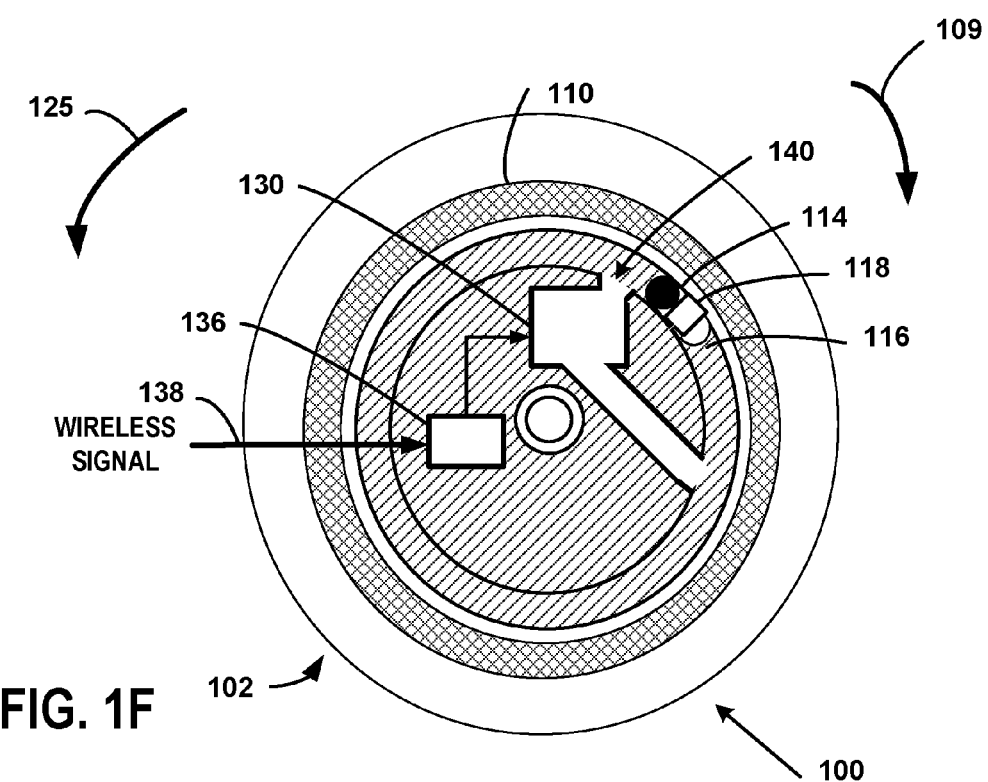
FIG. 1F is a block diagram of the wheel braking apparatus connected to the wheel where the braking apparatus is in a braking configuration and the ball bearing is in a forward braking position in accordance with the second exemplary embodiments.
Figure 1G:
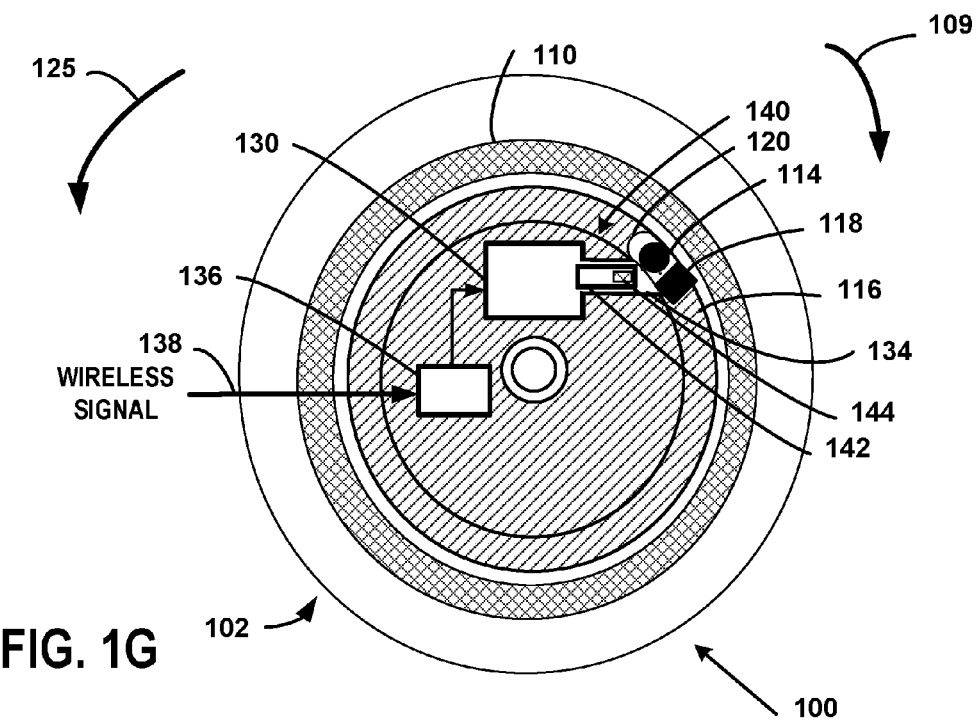
FIG. 1G is a block diagram of the wheel braking apparatus prior to the bearing barrier interfacing with the ball bearing as the rotating component is rotated in accordance with the second exemplary.
Figure 1H:
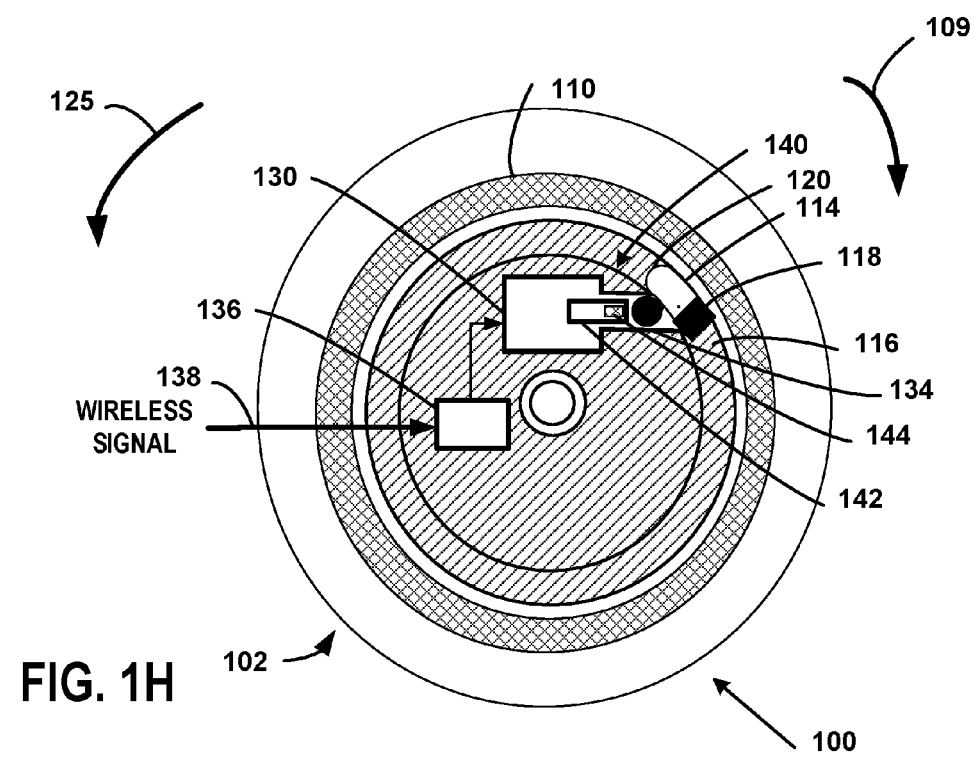
FIG. 1H is block diagram of the wheel braking apparatus in the non-braking configuration where the ball bearing is attracted to the mechanical actuator in accordance with the second exemplary embodiments.

FIG. 1E, FIG. 1F, FIG. 1G and FIG. 1H are block diagrams of an example of the braking mechanism 10 where the braking mechanism is a wheel braking apparatus 100 connected to a wheel 102. FIG. 1E represents the braking apparatus 100 in initial stages after being placed in the braking configuration and FIG. 1F represents the braking apparatus 100 when a ball bearing is in the forward braking position in an example in accordance with FIG. 1A, FIG. 1B and FIG. 1C. FIG. 1G represents the braking apparatus 100 after being placed in the braking configuration just prior to the ball bearing being lodged between the rotating component feature and the non-rotating component feature and FIG. 1H represents the braking apparatus 100 when a ball bearing is in the forward braking position in an example in accordance with FIG. 1D.

The diagrams may not be to scale, do not necessarily depict the shapes of the components, and are intended to generally convey components of the system 100 and the relationships between the components. The wheel 102 includes a tire (tread) 104 mounted on a wheel hub 106. For the examples herein, the tire 104 is hard rubber or polyurethane and is permanently mounted to the wheel hub 106 although other types of tires may be used. Also, for the examples discussed herein, the hub 106 is molded nylon and includes a wheel bearing 108 that can be mounted on an axle, kingpin, or bolt connected to a yoke assembly (not shown in FIG. 1E, FIG. 1F, FIG. 1G or FIG. 1H). The wheel can rotate in either direction and, for purposes of reference, the wheel rotates clockwise (forward rotation 109) when the wheel moves forward.

The wheel braking apparatus 102 includes a hub interface component 110 that is attached to the wheel hub 106. The hub interface component 110 is connected to the wheel hub 106 through a clutch mechanism in the exemplary embodiment. The clutch mechanism allows the wheel hub 106 to rotate relative to the hub interface component 110 when a torque threshold of torque between hub 106 and the component 110 is exceeded. An example of a suitable clutch mechanism is discussed below. In some circumstances, the clutch mechanism is omitted and the hub interface component 110 is securely affixed to the wheel hub 106. Also, in some circumstances, the hub interface component may be integrated with the wheel hub or the features of the hub interface component may be directly implemented on the wheel hub.

When the braking apparatus 100 is in the freewheeling, non-braking configuration, the hub interface component 110 rotates with the wheel hub 106 relative to a non-rotating component 112. The non-rotating component 112 is attached to, connected to, or otherwise in contact with a yoke such that it cannot rotate relative to the yoke. For the example discussed below, the non-rotating component 112 is a plastic housing that includes a recess configured to accept one arm of the yoke when the wheel is mounted onto the yoke. The non-rotating housing is held in place by the yoke and an axle bolt. Other techniques and configurations may be used to form the non-rotating component 112. For example, the non-rotating component may include an axle that does not rotate.

In the braking configuration, a ball bearing 114 is positioned within a bearing groove 116 in the hub interface component 110 and is interposed between a bearing wall 118 of the non-rotating component 112 and one side of the bearing groove 116. When the ball bearing 114 is not within the bearing groove 116, the bearing groove 116 is able to rotate past the bearing wall 118 as the wheel is rotated. If the ball bearing 114 is within the bearing groove 118, however, the ball bearing 114 contacts the bearing wall 118 and one end of the bearing groove 116 and the bearing groove 116 cannot rotate past the bearing wall 118. The ball bearing 114 in this situation is positioned between the bearing wall 118 and either a first bearing barrier 120 or second barrier 122 of the bearing groove 116 where the bearing barriers 120, 122 are the ends of the groove 116. As a result, the hub interface component 110 is not able to rotate relative to the non-rotating component 112. The position of the ball bearing 114 in the braking configuration depends on the direction that the wheel 102 is being rotated before braking occurs. In one direction (forward rotation 109), the ball bearing 114 becomes interposed between the first bearing barrier 122 at one end of the bearing groove 116 and a first side 124 of the bearing wall 118. In the other direction (reverse rotation 125), the ball bearing 114 becomes interposed between the second bearing barrier 122 at the other side of the groove and the other side 126 of the bearing wall 118. The braking apparatus 100 may have more than one bearing wall 118. Therefore, the first side of the bearing wall and the second side of the bearing wall are sometimes referred to herein as the first bearing wall and the second bearing wall, respectively. The first bearing wall 124 and the second bearing wall 126 may be different sides of single bearing wall 118. FIG. 1D represents the braking apparatus 100 where the ball bearing 114 is in a forward braking position. Although the block diagrams in FIG. 1E, FIG. 1F, FIG. 1G, FIG. 1H show a single bearing groove 116, the hub interface component 110 may include any number of bearing grooves 116. As discussed below with reference to one example, six bearing grooves 116 may be used. Such an implementation decreases the delay from the release of the ball bearing 114 to braking and decreases the time to return to the non-braking position via reverse rotation. The bearing groove 116 is any recess, cup, or other feature that is capable of holding and guiding the ball bearing 114 to the braking position where the bearing prevents the bearing groove 116 to rotate past the non-rotating component 112. Accordingly, the bearing groove 116 is one example of the rotating component feature 22 discussed above. Although in the exemplary embodiment the bearing groove 116 is formed within the hub interface component, other techniques may be used to provide a bearing groove 116. For example, where the clutch mechanism is omitted, one or more bearing grooves 116 may be formed directly in the wheel hub and the hub interface component may be omitted. In another example, the bearing groove 116 may be a slightly longer than the diameter of the ball bearing 114 and may be a cup-shaped recess.

FIG. 1E and FIG. 1F are illustrations in accordance with the first exemplary embodiments. FIG. 1E shows the ball bearing 114 traveling from a non-braking position 128 in a bearing release mechanism 130 to a bearing port 132 at the end of a bearing channel 134. FIG. 1F shows the ball bearing 114 in one braking position where the ball bearing 114 is between the first bearing barrier 120 of the bearing groove and the first side 124 of the bearing wall 118. The bearing release mechanism 130 maintains the ball bearing 114 in the non-braking position 128 until electronics 136 actuate the bearing release mechanism 130 in response to receiving a wireless signal 138. After the ball bearing 114 is released, the ball bearing 114 travels through the bearing channel 134 over a bearing path 139 through the bearing port 132. The ball bearing 114 enters the bearing groove 116 when the bearing groove 116 is aligned with the bearing port 132. If the bearing port 132 is not aligned with the bearing groove 116 when the bearing is at the bearing port 132, the ball bearing 114 remains at the end of the bearing channel 134 in the bearing port 132 while the non-grooved portions of the hub interface component 110 slide past the ball bearing 114 as the wheel 102 is rotated. Once the wheel 102 is sufficiently rotated to align the bearing port 132 with the bearing groove 116, the bearing is allowed to fall into the bearing groove 116. As the wheel 102 is rotated further, the bearing groove 116 is rotated toward the bearing wall 118 until the ball bearing 114 reaches a braking position. The bearing port 132 may be aligned with the bearing groove 116 by rotating the wheel 102 in either direction. Further, after the ball bearing 114 is within the bearing groove 116, the wheel 102 can be rotated in either direction to place the ball bearing in either the forward braking position or the reverse braking position.

The bearing release mechanism 130 is any device or apparatus that can maintain the ball bearing 114 in the non-braking position 128 and be activated to release the ball bearing 114 in response to signals generated by electronics 136. As discussed below in further detail, an example of a suitable release mechanism 130 includes a threaded block connected to a threaded screw shaft of an electric motor. In the non-braking (freewheeling) position, the threaded block is positioned over the bearing channel 134 such that the ball bearing 114 cannot enter the bearing channel 134. The electronics 138 activate the bearing release mechanism 130 in this implementation by applying power to the motor. As the motor rotates the threaded screw shaft, the block is threaded onto the shaft and pulled to a position that allows the ball bearing to travel into the bearing channel and, consequently, into the bearing groove 116. Other examples of the bearing release mechanism 130 include solenoids and magnetic devices. Accordingly, the bearing release mechanism 130 is an example of at least a portion of the interposer controller 16.

As the wheel 102 is further rotated, the ball bearing 114 is carried within the bearing groove 116 until it comes in contact with the bearing wall 118. In some circumstances, a bearing deflector (not shown in FIG. 1E or FIG. 1F) keeps the ball bearing 114 from falling into the bearing release mechanism 130 when the wheel 102 is rotated in a particular direction. The bearing deflector may be a section of spring steel angled to cause the ball bearing to "jump" the opening 140 to the bearing release mechanism 130 when the wheel 102 is rotated in one direction (e.g. forward rotation 109). When the wheel 102 is rotated in the opposite direction (reverse rotation 125), however, the bearing deflector 130 causes the ball bearing 114 to fall into the opening 140 when the ball bearing 114 reaches the opening 140. If the braking apparatus 100 is in the braking configuration, the bearing release mechanism 130 remains in the retracted position and the ball bearing falls through the bearing channel 134. If the bearing release mechanism 130 includes a motor and threaded block, for example, the threaded block remains retracted and the ball bearing falls through the bearing channel 134. Continued rotation results in the ball bearing 114 being brought back to one of the braking positions between the bearing wall 118 and one of the bearing barriers 122, 124 of the bearing groove 116. If the threaded block is not retracted, the ball bearing 114 returns to the non-braking position 128 within the bearing release mechanism 130.

For the example where the bearing release mechanism 130 includes the motor and threaded block, the braking apparatus 100 is placed in the non-braking (freewheeling) position by rotating the motor to move the threaded block into a position that does not allow the ball bearing 114 to enter the bearing channel 134. The return to the non-braking configuration occurs after the wheel 102 is rotated in a direction that allows the ball bearing 114 to enter the opening 140 of the bearing release mechanism 130.

As discussed below, the electronics 136 include a receiver that is configured to receive at least one wireless signal 138 within at least one frequency band. In some deployments of the braking apparatus 100, the braking apparatus 100 is connected to a wheel 102 on a shopping cart and the wireless signal 138 is generated by a transmitter near an exit of a store. One suitable implementation includes installing one or more wire loops or other antennas in the floor near the store exit where the transmitters transmit wireless signals at a relatively low frequency. Transmitters transmitting higher frequency signals can be used to control the braking apparatus from distances farther than the low frequency transmitters. In response to receipt by the receiver of wireless signals 138 transmitted through the antennas, the electronics 136 set the braking apparatus to the appropriate configuration.

Therefore, the braking apparatus 100 of FIG. 1E and FIG. 1F is an example of the braking mechanism 10 where the moveable interposer 18 is a ball bearing 114, the rotating component feature 22 is a bearing groove 116, the non-rotating component feature 20 is a bearing wall 118 and the movement of the ball bearing is caused at least partially by gravity. In the example, the rotating component 12 is the hub interface component 110 and the non-rotating component 14 is the non-rotating component 112. In this example, the interposer controller 16 is implemented with electronics controlling a bearing release mechanism 130 and a rotating hub interface component 110.

FIG. 1G and FIG. 1H are illustrations in accordance with the second exemplary embodiments. For the example of FIG. 1G and FIG. 1H, therefore, the ball bearing 114 is magnetic and a mechanical actuator 142 is made of a magnetically attractive material or includes a magnetically attractive component 144. In some situations, the mechanical actuator 142 may be magnetic and the ball bearing 114 may be made of a magnetically attractive material or include a magnetically attractive component. For the example, the ball bearing is placed in the braking position by extending the mechanical actuator through the bearing channel and pushing the ball bearing 114 into the region where it becomes interposed between the bearing barrier 120 of the bearing groove and the bearing wall 118 of the non-rotating component. FIG. 1G shows the bearing just prior to the bearing barrier 120 interfacing with the ball bearing 114 as the rotating component is rotated. FIG. 1H shows the braking apparatus in the non-braking configuration where the ball bearing is attracted to the mechanical actuator and pulled back through the bearing channel and out of the region where the ball bearing can be interposed between the bearing groove and the bearing wall. As discussed below, the mechanical actuator 142 is an electric motor with a threaded block that is extended and retracted by rotating the electric motor.

Figure 2:
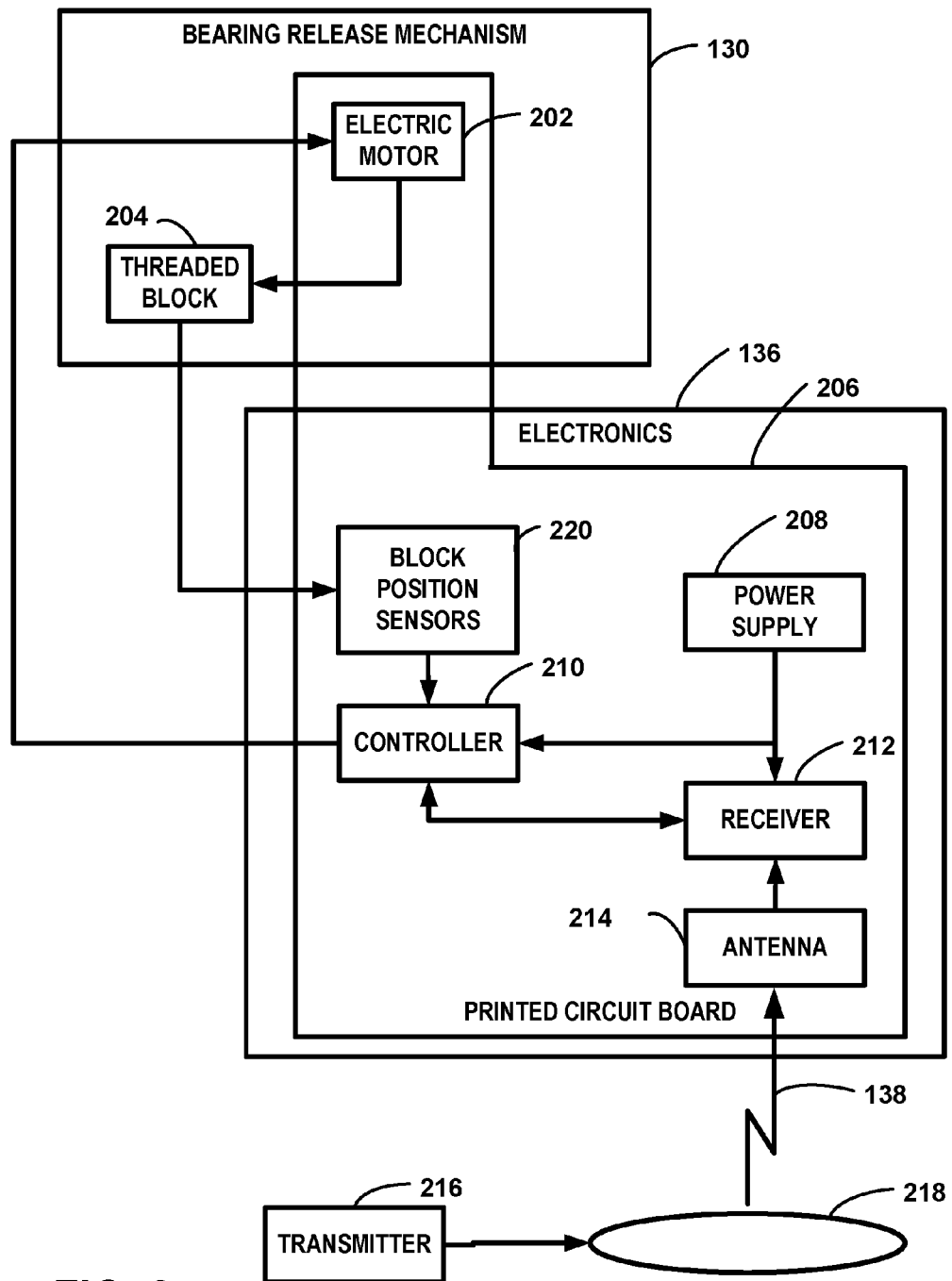
FIG. 2 is a block diagram of electronics connected to the bearing release mechanism where the bearing release mechanism includes an electric motor and a threaded block.

FIG. 2 is a block diagram of the electronics 136 connected to the bearing release mechanism 130 where the bearing release mechanism 130 includes an electric motor 202 and a threaded block 204. Accordingly, FIG. 2 is a block diagram of portions of the braking apparatus 100 in an example where the bearing release mechanism 130 includes a motor 202 and a threaded block 204. The block diagram of FIG. 2 is in accordance with the first and second exemplary embodiments. The electronics 136 include any combination of electrical components, integrated circuits (ICs) Application Specific Integrated Circuits (ASICs), resistors, capacitors, inductors, connections, printed circuit boards, wires, and/or other electrical devices that perform the functions described herein. An example of a suitable implementation of the electronics 136 includes soldering electrical devices onto a printed circuit board (PCB) 206 where the PCB 206 fits within a non-rotating housing of the braking apparatus 100. The electronics 136 include a power supply 208, such as a battery, to provide electrical power to the electrics as well as to the motor 202 in the bearing release mechanism 130. A controller 210 performs the described functions as well as facilitating the overall operation of the braking apparatus 100. For the examples described herein, the controller 210 comprises a processor with a memory and other supporting circuits. The controller 210, however, may be any combination of electrical devices that can perform the described tasks. For example, the controller 210 may include logical devices in some circumstances. A receiver 212 is configured to receive wireless signals 138 through an antenna 214. The wireless signals 138 are typically transmitted by a transmitter 216 through a transmitting antenna 218. As mentioned above, the transmitting antenna 218 may be a wire loop embedded in the floor near and exit of a store where the braking apparatus 100 is implemented as part of caster of a shopping cart. The wireless signals 138 may also be transmitted by handheld devices or other transmitters, depending on the particular implementation and requirements. In the exemplary embodiment, the receiver 212 can receive signals within two frequency bands and the antenna 214 is comprised of two antennas. Low frequency signals that have relatively short propagation distances are received through an inductor and higher frequency signals having longer propagation distances are received through an antenna formed with a conductive trace on a printed circuit board. In implementations where the braking apparatus is used on a shopping cart, the lower frequency signals are typically used for transmission when the braking apparatus 100 is at particular locations and are emitted from wire loops in the floor near the exit of store. The higher frequency signals in such an implementation are typically transmitted by hand held devices or from transmitters that are intended to control the braking apparatus 100 from a greater distance. Examples of suitable frequencies for the wireless signals includes frequencies in the 2.4 GHz band as defined by the IEEE 802.11 set of standards and 8 KHz electromagnetic signal emitted by a buried wire to establish a magnetic field at perimeters to a monitored area.

Although other techniques can be used, the bearing release mechanism 130 includes an electric motor 202 and a threaded block 204 where rotation of the motor in one direction extends the threaded block to a position that does not allow the ball bearing to enter the bearing channel. As explained above, counter rotation of the motor in the opposite direction retracts the threaded block 204 to a position that allows the ball bearing to enter the bearing channel. Block position sensors 220 provide the controller 210 with information regarding the position of the threaded block 204. The controller 210 uses the information to control the motor 202 to stop rotation when the threaded block 204 has reached the predetermined positions and to reset the bearing release mechanism 130. For example, signals from the block position sensors 220 indicate when the motor 202 has reached the fully extended position and the fully retracted position so that the controller can withdraw power from the motor. The block position sensors 220 also allow the controller 210 to be aware of the threaded block position after an interruption of operation, such as when a battery is replaced. Switches can be used to form the block position sensors where the position of the threaded block determines whether a particular switch is open or closed. An example of suitable implementation of the block position sensors 220 includes forming switches between features on the threaded block 204 and contacts on the PCB 206. Although the block sensors may only act as limit switches and provide information corresponding to whether the threaded block is fully extended or retracted, some implementations may provide information indicating positions between the two extremes. For example, several block position sensors may allow the controller 210 to determine the position of the block based on the state of the sensors.

In the exemplary embodiment, the motor 202 and the block position sensors 220 are mounted on the PCB 206. In some circumstances, however one or both of these components are not mounted on the PCB 206. For example, the motor 202 may be connected to the non-rotating housing in some situations.

Figure 3:
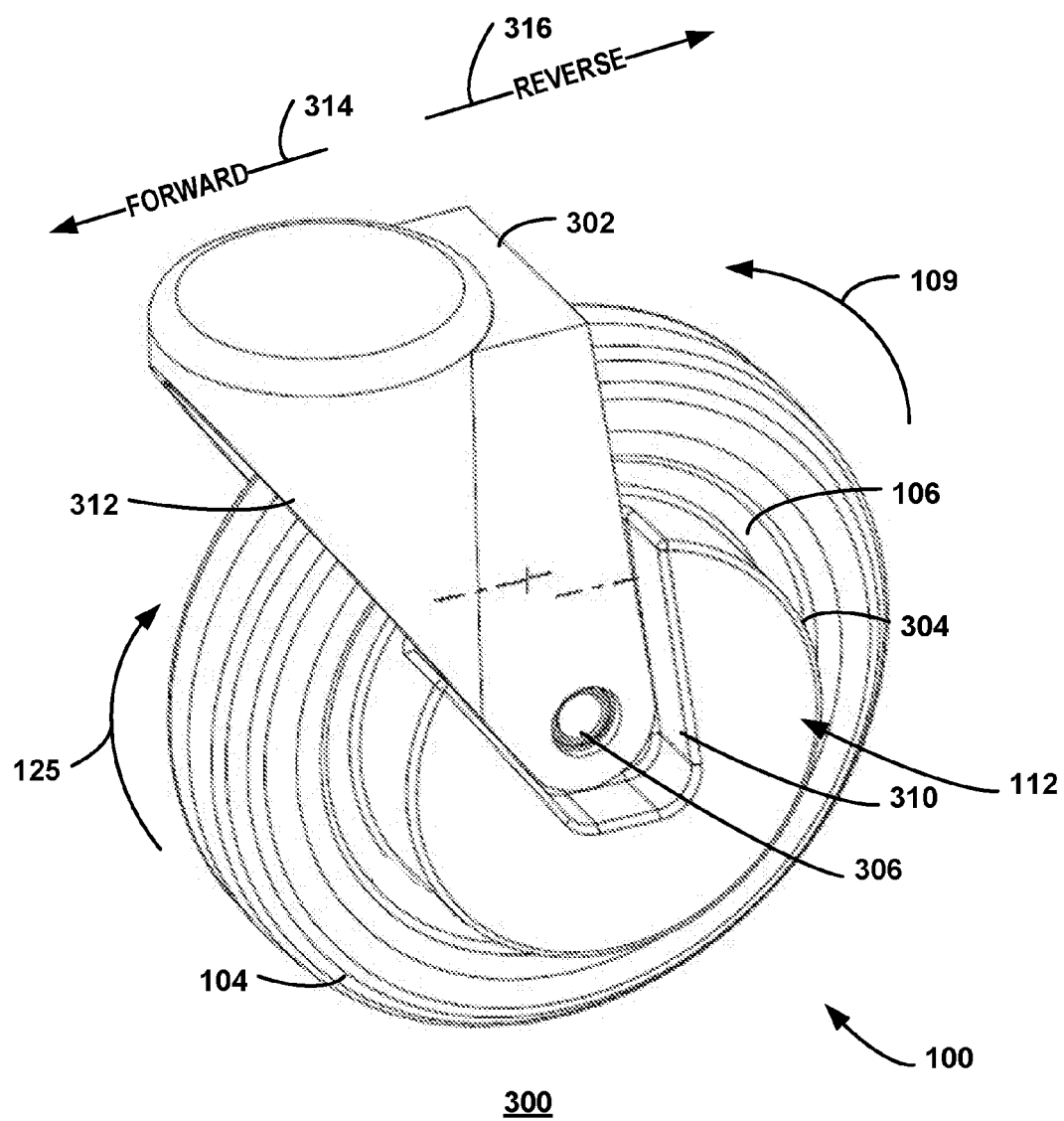
FIG. 3 is an illustration of a perspective view of a caster assembly including the braking apparatus connected to the wheel and mounted on a yoke in accordance with the exemplary embodiment of the invention.

FIG. 3 is an illustration of a perspective view of a caster assembly 300 including the braking apparatus 100 connected to the wheel 102 and mounted on a yoke 302 in accordance with the exemplary embodiment of the invention. In a typical implementation, the caster assembly 300 is mounted on a vehicle such as a shopping cart or dolly. The illustration of FIG. 3 is in accordance with the first and second exemplary embodiments.

In the exemplary embodiments discussed herein, the non-rotating component 112 is a non-rotating housing 304 made of plastic. The non-rotating housing 304 is held in place by the yoke 302 and an axle bolt 306 that passes through the wheel bearing 108. A portion of the non-rotating housing 304 fits within the wheel hub 106. An outer portion 308 of the non-rotating housing 304 includes a yoke recess 310 for accepting one arm 312 of the yoke 302. The non-rotating housing 304 is held in place by the yoke arm 312 and cannot rotate relative to the yoke 302.

When the braking apparatus 100 is in the non-braking state (freewheeling state), the wheel 102 can rotate in either direction 109, 125 and the vehicle can be moved in either the forward direction 314 or the reverse direction 316. When the caster assembly 300 moves forward 314, the wheel 102 rotates with forward rotation and when the wheel moves in reverse 316, the wheel rotates with reverse rotation 125. In FIG. 3, forward rotation 109 is counter-clockwise and reverse rotation 125 is clockwise.

Figure 4A:
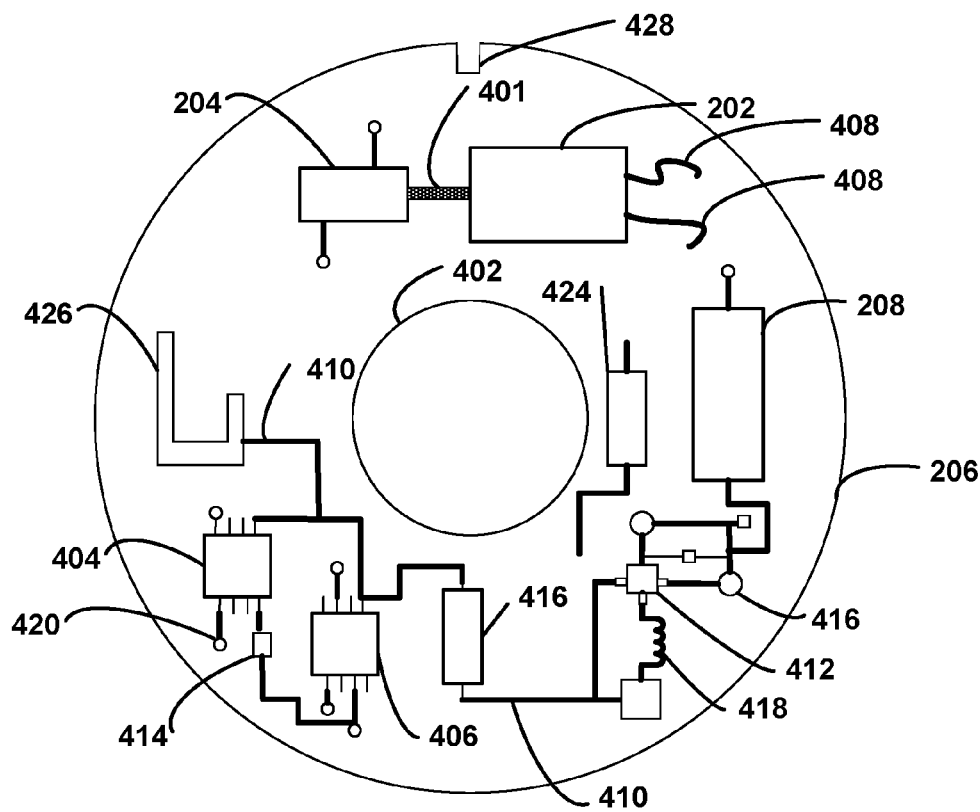
FIG. 4A is an illustration of a top view of a printed circuit board (PCB) assembly
Figure 4B:
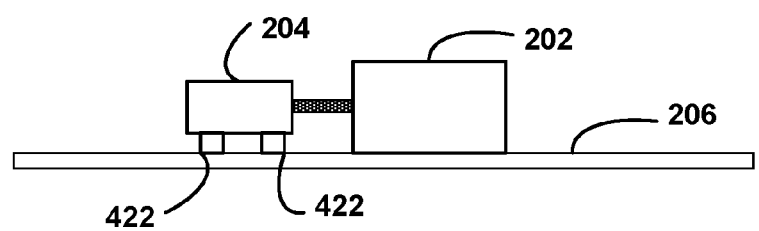
FIG. 4B is an illustration of a side view of the PCB assembly.

FIG. 4A is an illustration of a top view of a PCB assembly 400 and FIG. 4B is an illustration of a side view of PCB assembly 400. Some of the components are omitted in the view of FIG. 4B for clarity. In the exemplary embodiments, the electronics 136 and the electrical motor 202 are mounted on the PCB 206.

The motor 202 is connected to the threaded block 204 by a threaded shaft (screw shaft) 401. As the motor 202 is activated, the threaded shaft 401 rotates within the threaded block 204 to move the threaded block between the retracted position and the extended position.

The PCB 206 has a hole 402 to allow assembly within the caster assembly 300. The electronics 136 may include any combination of ICs 404, ASICs 406, electrical components, wires 408, and conductive traces 410. The electrical components may include transistors 412, resistors 414, capacitors 416, inductors 418, and other devices where the electrical components may be discrete devices, integrated as part of single package including several components, or may be at least partially formed by conductive traces on the PCB 206. One or more of the types of components discussed may not be used some circumstances. The PCB 206 may include any number of dielectric layers and conductive traces 410 where traces 410 and layers may be connected through vias 420 through the PCB.

In the exemplary embodiments, the block position sensors 422 are soldered to the PCB 206 and are positioned adjacent to the threaded block 204. The block position sensors 422 are switches used to designate limits of travel in the exemplary embodiment that indicate a position of the threaded block 204 to the controller 210. Although discrete devices can be soldered or otherwise attached to the PCB 206 in some implementations, the block position sensors 420 may be implemented using conductive pads on the PCB and contacts on the threaded block.

As explained above, the antenna 214 includes two antennas in the exemplary embodiment. A low frequency antenna 424 is implemented with an iron core inductor 424 and a conductive trace 426 on the PCB 206 forms the high frequency antenna 426. The antenna 214 may be a discrete component, wire, or other device in some circumstances. The various patterns, objects, and blocks shown in FIG. 4A are intended to generally represent the electronics 136 and do not necessarily represent any particular electrical circuit.

In some circumstances, the PCB 206 includes an alignment feature 428 that facilitates appropriate alignment between the PCB 206 and the non-rotating housing 304. An example of a suitable feature includes a notch in the PCB 206 that is aligned with a tab of the non-rotating housing 304.

Figure 5A:
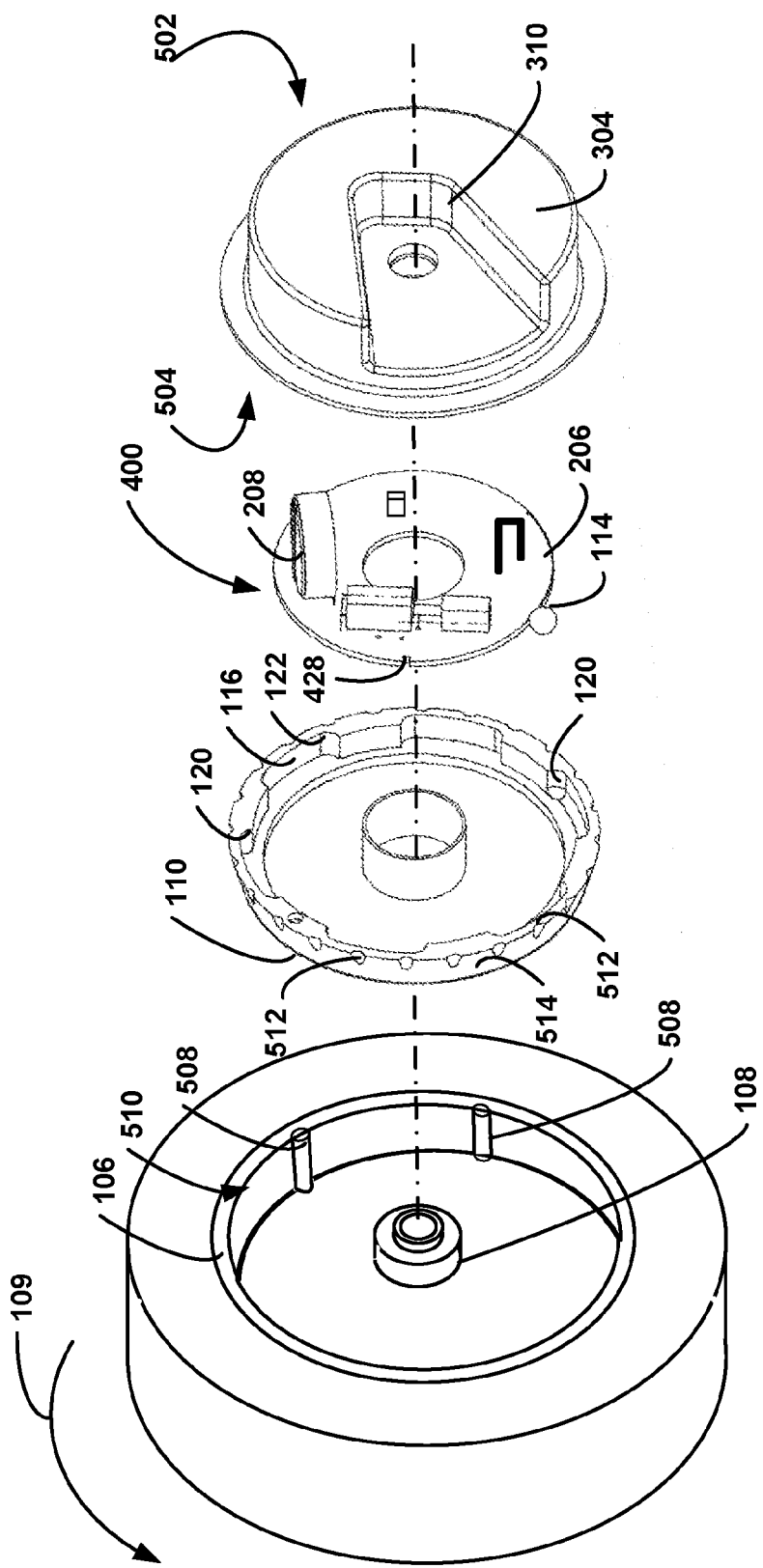
FIG. 5A is an illustration of an exploded view of the wheel and braking apparatus in accordance with the first exemplary embodiments.
Figure 5B:
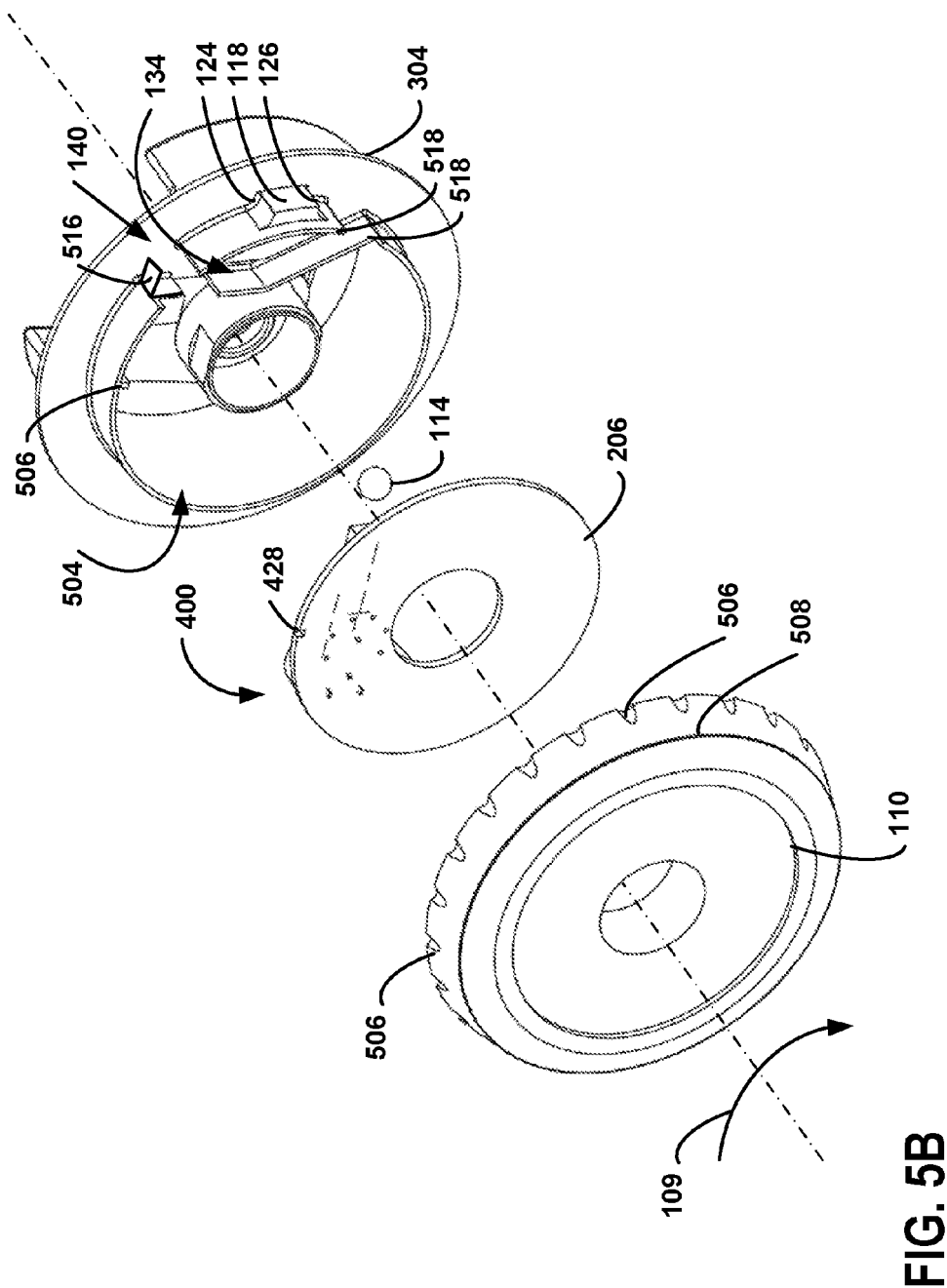
FIG. 5B is an illustration of another exploded view of the wheel and braking apparatus in accordance with the exemplary embodiment.

FIG. 5A and FIG. 5B are illustrations of exploded views of the wheel 102 and braking apparatus 100 in accordance with the first exemplary embodiments where the ball bearing 114 is at least partially moved by gravity to the braking position. For reference, the arrow (109) indicates the forward wheel rotation 109. The outer portion 502 of the non-rotating housing 304 includes the yoke recess 310 to engage the yoke and the inner portion 504 of the non-rotating housing includes features that at least partially form the bearing channel 134. The electric motor 202 and electronics 136 are mounted on a circular printed circuit board 206 which fits within and aligns within the non-rotating housing 304 such that the threaded block 204 is aligned at the opening 140 to the bearing channel 134. In the exemplary embodiment, a tab 506 on inner portion 504 of the non-rotating housing 304 fits within the notch 424 in the PCB 206 to align the components. When assembled, the wheel bearing 108 of the wheel hub 106 fits within the hole 402 within PCB 206 and an opening within the hub interface component 110.

The hub interface component 110 fits within the wheel hub 106 such that protruding features 508 on the inner surface 510 of the wheel hub 106 engage recesses 512 on the outer surface 514 of the hub interface component 110. The hub interface component 110 is discussed in further detail below with reference to FIG. 8A, FIG. 8B and FIG. 8C.

A bearing deflector 516 diverts the ball bearing 114 from entering the opening 140 when the wheel 102 is rotated forward 109 while the braking apparatus is in the braking configuration. The bearing deflector 516 is section of spring steel connected to the non-rotating housing 304 in the exemplary embodiment. The angle of the spring steel section is selected to divert the bearing over the opening 140 when the wheel is rotated and the ball bearing 114 is in a bearing groove 116. When the wheel is rotated in reverse 125, however, the ball bearing 114 can fall into the opening 140.

The bearing channel 134 is formed by portions of the non-rotating housing 304 and the PCB 206 in the example embodiment. Features 518 form three sides of the rectangular channel and an adjacent portion of the PCB 206 forms the fourth side. The bearing channel 134, however, may be formed in different ways. For example, the entire bearing channel may be formed within the non-rotating housing 304. Such a configuration may be desired in implementations where restricting contact of the ball bearing 114 with the PCB 206 is desired or where the PCB 206 does not extend to the region adjacent to the bearing channel features 518 in the non-rotating housing 304.

Figure 6A:
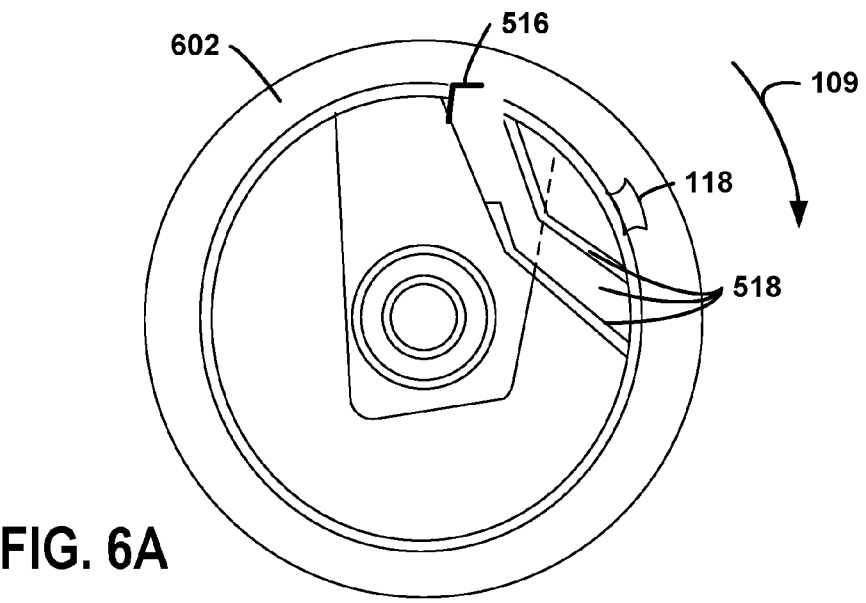
FIG. 6A is an illustration of a side view of the inner portion of the non-rotating component housing.
Figure 6B:
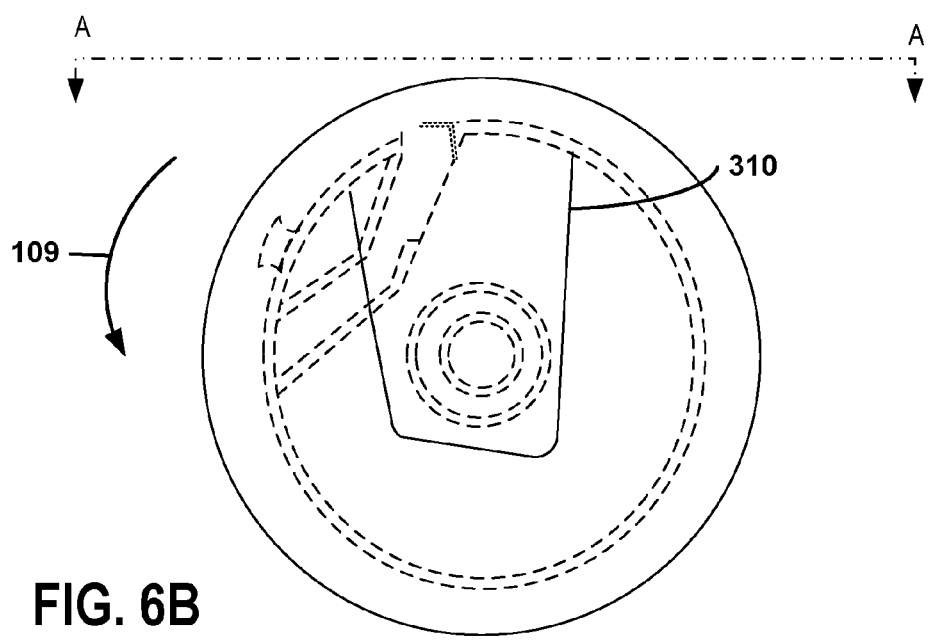
FIG. 6B is an illustration of a side view of the outer portion of the non-rotating component housing.
Figure 6C:
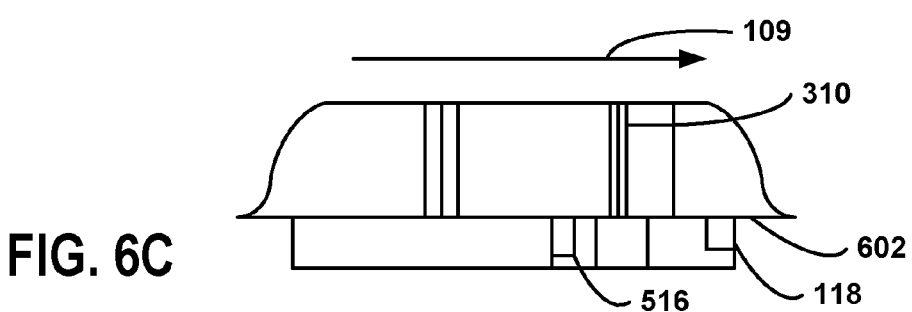
FIG. 6C is an illustration of a top view of the non-rotating component housing at line A-A of FIG. 6B.

FIG. 6A is an illustration of a side view of the inner portion 504 of the non-rotating component housing 304. FIG. 6B is an illustration of a side view of the outer portion 502 of the non-rotating component housing 304. FIG. 6C is an illustration of a top view of the non-rotating component housing at line A-A of FIG. 6B. FIG. 6A, FIG. 6B, and FIG. 6C are illustrations in accordance with the first exemplary embodiments. In the first and second exemplary embodiments, the non-rotating housing 304 is a single unit made of molded plastic such as shatter resistant Polypropylene, Polyethylene, Acrylonitrile Butadiene Styrene (ABS). The bearing channel is formed by plastic walls 518 that extend from the opening, to the bearing release mechanism, to the bearing port with a section configured to allow the threaded block to move through the bearing channel. The bearing wall 118 is part of the non-rotating housing 304 in the example. The non-rotating housing 304 can be formed using other techniques and may include multiple parts made from different materials. For example, in addition to the bearing deflector 501, the bearing wall and bearing channel may be formed from different materials and attached to the non-rotating housing 304 in some circumstances.

The non-rotating housing 304 has a bearing guide flange 602. When the braking assembly is assembled, an edge of the hub interface component 110 rotates against the bearing guide flange 602. When the ball bearing 114 is one of the bearing grooves 116, therefore, the bearing guide flange 602 encloses the ball bearing 114 between the hub interface component 110 and the bearing guide flange 602.

Figure 7A:
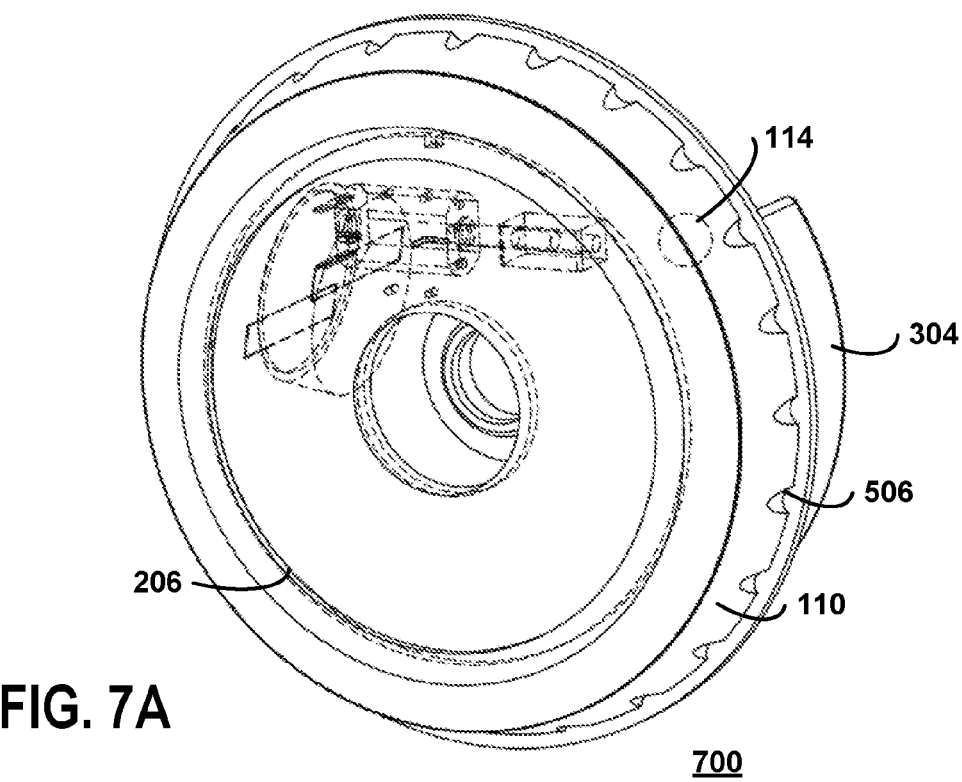
FIG. 7A is an illustration of a perspective view of the braking assembly including the hub interface component, the PCB assembly, the ball bearing, and the non-rotating housing.
Figure 7B:
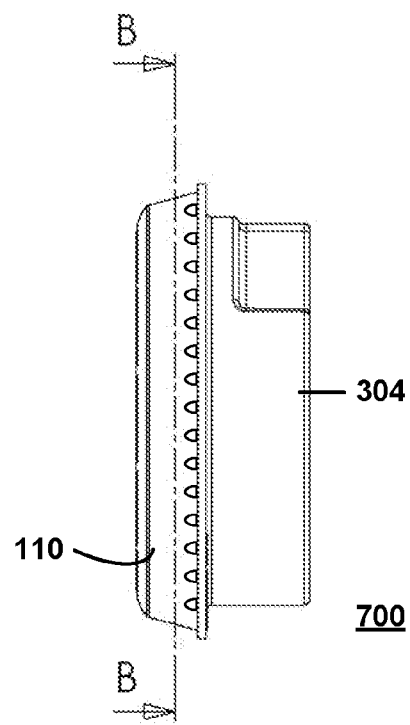
FIG. 7B is an illustration of a side view of the braking assembly.

FIG. 7A is an illustration of a perspective view of the braking assembly 700 including the hub interface component, the PCB assembly 400, the ball bearing 114, and the non-rotating housing 304. FIG. 7B is an illustration of a side view of the braking assembly 700. In the interest of clarity, some details of the interior of the assembly 100 are omitted in FIG. 7A. FIG. 7B is an illustration of a side view of the braking assembly 700.

After the braking assembly 700 is assembled, the ball bearing 114 and PCB assembly 400 are sealed between the hub interface component 110 and the non-rotating housing 304. The edge 702 of hub interface component 110 slides against the bearing guide flange 602 when the hub interface component 110 rotates relative to the non-rotating housing 304. In the non-braking configuration, the ball bearing 114 is positioned between the PCB 206 and the non-rotating housing 304. When the breaking apparatus is in the braking configuration and the ball bearing 114 has been released through the bearing channel 134, the ball bearing 114 falls into a bearing groove 116. As the hub interface component 110 is rotated, the ball bearing slides or rolls against the bearing guide flange 602 until it is interposed between one of the bearing barriers and the one of the side of the bearing wall 118.

Figure 8A:
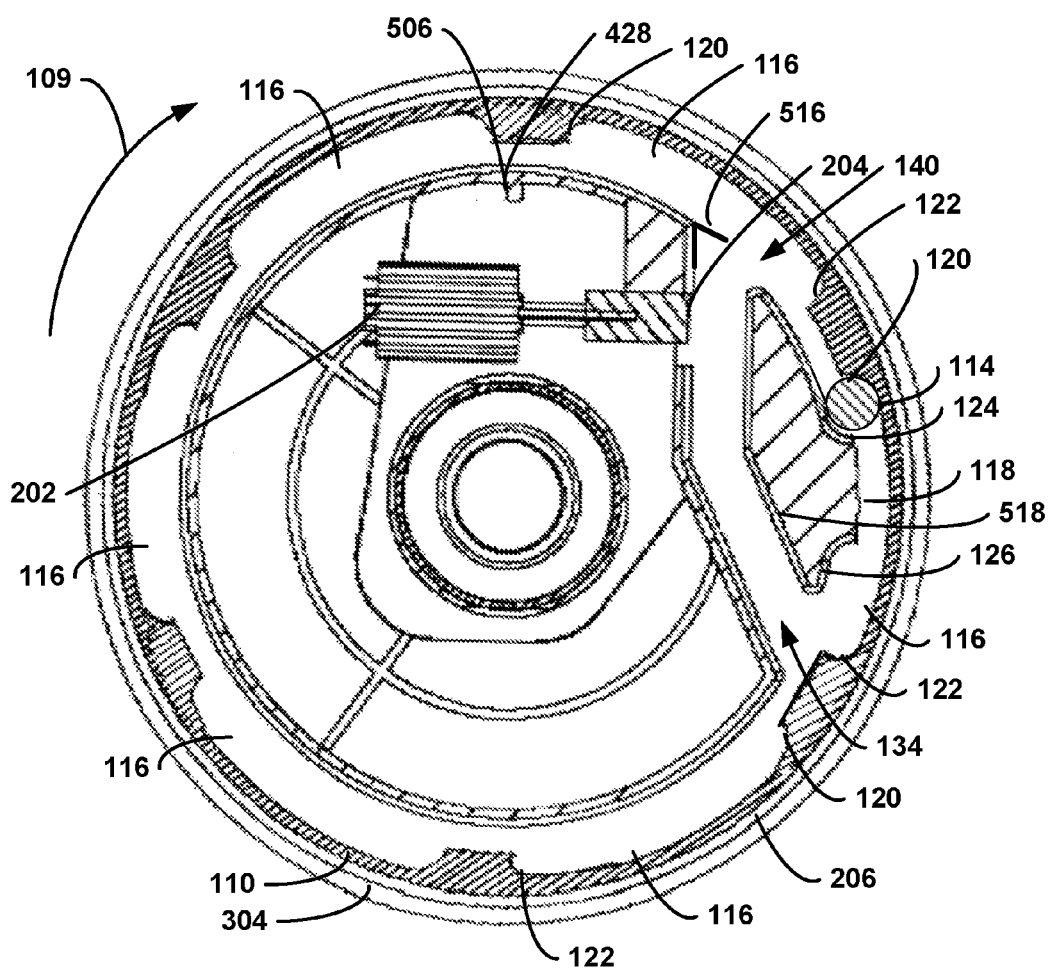
FIG. 8A is an illustration of a cross sectional side view of the braking assembly taken along line B-B of FIG. 7B when the braking apparatus is in the braking configuration and the bearing is in a forward braking position.

FIG. 8A through FIG. 8E are illustrations in accordance with the first exemplary embodiments and, therefore, illustrate the movement of the components for the examples where the movement of the ball bearing 114 to the braking position is at least partially due to gravity. FIG. 8A is an illustration of a cross sectional side view of the braking assembly 700 taken along line B-B of FIG. 7B when the braking apparatus 100 is in the braking configuration and the ball bearing 114 is in a forward braking position. When the braking apparatus 100 is in the braking configuration, the threaded block 204 is moved by the motor 202 to the retracted position. Rotating the threaded shaft within the threaded block 204 moves the threaded block 204 away from the bearing channel 134 allowing the ball bearing 114 to fall through the bearing channel 134 into one of the bearing grooves 116. Depending on the rotation of the wheel 102, the ball bearing 114 eventually becomes interposed in either the forward braking position or the reverse braking position. The ball bearing 114 is shown in the forward braking position in FIG. 7A which results when the wheel 102 is rotated in the forward direction 109. The ball bearing 114 contacts a first bearing barrier 120 of one of the bearing groves 116 and the first bearing wall 124 of the non-rotating component. In this position, the hub interface component 110 cannot be rotated relative to the non-rotating component 112 (non-rotating housing 304) in the forward direction 109. As a result, the wheel 102 cannot be rotated forward. As discussed below, if the wheel 102 is rotated in reverse 125, the ball bearing 125 eventually becomes interposed in the reverse braking position between the second bearing wall 126 and the second bearing barrier 122 of one of the bearing grooves 116. The wheel 102 cannot be rotated in the reverse direction 125 when the ball bearing 114 is in the reverse braking position. In the exemplary embodiment, the clutch mechanism allows the wheel 102 to rotate when a torque threshold exceeded. Accordingly, if force is applied to move the vehicle when the braking apparatus 100 is in the braking configuration, the wheel 102 will only rotate when the force exceeds the force corresponding to the threshold torque.

Figure 8B:
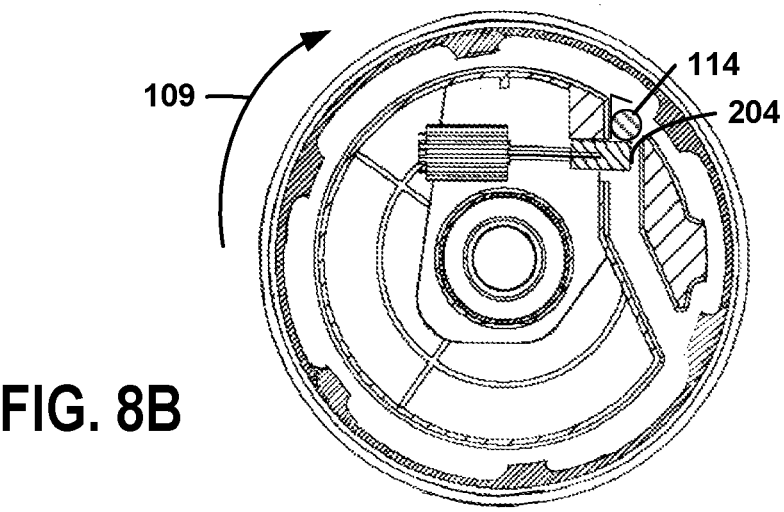
FIG. 8B is an illustration of a cross sectional side of the braking assembly taken along line B-B of FIG. 7B when the braking apparatus is in the non-braking configuration and the ball bearing is contained in the bearing release mechanism.

FIG. 8B is an illustration of a cross sectional side view of the braking assembly 700 taken along line B-B of FIG. 7B when the braking apparatus 100 is in the non-braking configuration and the ball bearing 114 is contained in the bearing release mechanism 134. In the non-braking configuration, the wheel 102 can rotate freely in either direction.

Figure 8C:
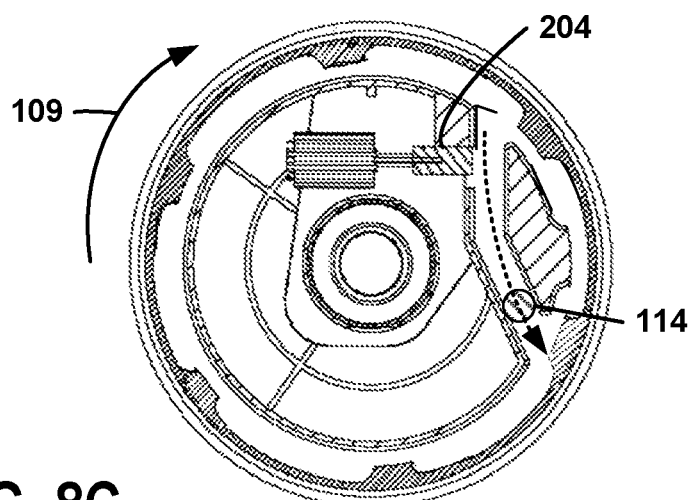
FIG. 8C is an illustration of a cross sectional side of the braking assembly taken along line B-B of FIG. 7B when the braking apparatus is in the braking configuration and the ball bearing is released into the bearing channel.

FIG. 8C is an illustration of a cross sectional side view of the braking assembly 700 taken along line B-B of FIG. 7B when the braking apparatus 100 is in the braking configuration and the ball bearing 114 is released into the bearing channel 134. In the exemplary embodiment, the electric motor 202 is activated and the threaded block 204 is moved to a position that allows the ball bearing 114 to fall through the bearing channel 134. Accordingly, gravity moves the ball bearing 114 to the bearing groove 116 after the ball bearing 114 is released. In FIG. 8C, the ball bearing 114 is shown just prior to be expelled through the bearing port 132 of the bearing channel 134.

Figure 8D:
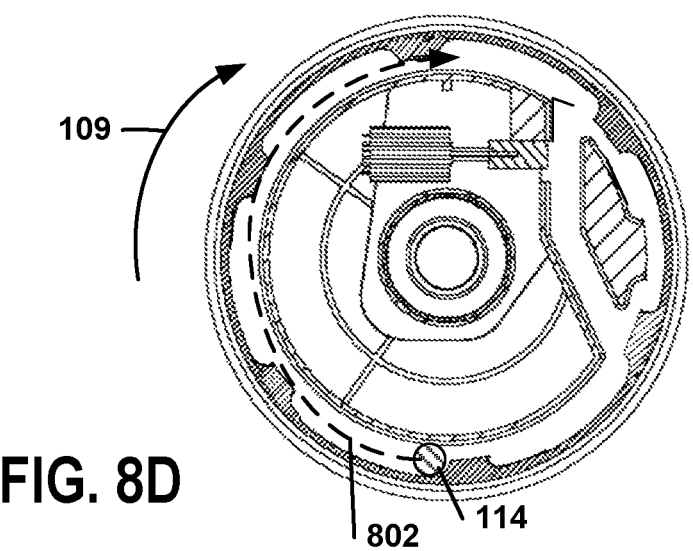
FIG. 8D is an illustration of a cross sectional side view of the braking assembly taken along line B-B of FIG. 7B when the braking apparatus is in the braking configuration and the ball bearing is within one of the bearing grooves while the wheel is rotated in the forward direction.

FIG. 8D is an illustration of a cross sectional side view of the braking assembly 700 taken along line B-B of FIG. 7B when the braking apparatus 100 is in the braking configuration and the ball bearing is within one of the bearing grooves 116 while the wheel 102 is rotated in the forward direction 109. As the wheel 102 is rotated forward, the ball bearing 114 slides and/or rolls against the bearing guide flange 602 as the bearing groove 116 rotates. The bearing deflector 516 causes the ball bearing 114 to "jump" the opening 140 to the bearing channel. The bearing deflector 516 has a configuration such that the ball bearing cannot fall into the bearing channel when the wheel is rotated forward 109. The ball bearing 114 continues along the circular path 802 until it is trapped between the bearing barrier 120 and the first bearing wall 124 as shown in FIG. 8A.

Figure 8E:
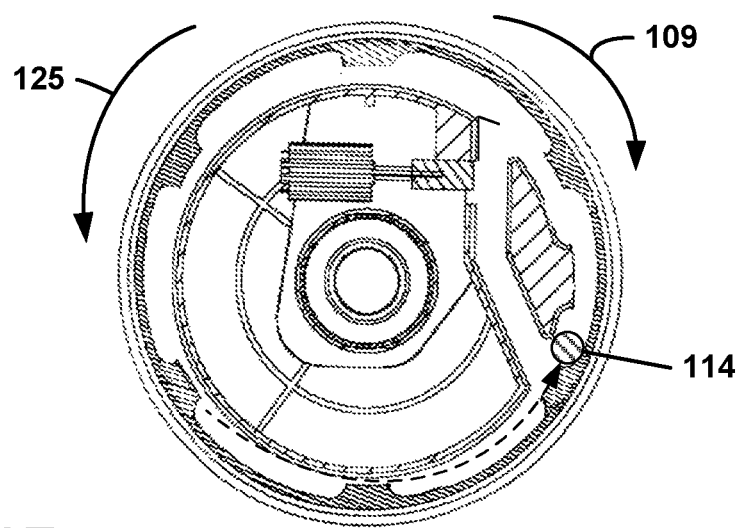
FIG. 8E is an illustration of a cross sectional side view of the braking assembly taken along line B-B of FIG. 7B when the braking apparatus is in the braking configuration and the ball bearing is within one of the bearing grooves while the wheel is rotated in the reverse direction.

FIG. 8E is an illustration of a cross sectional side view of the braking assembly 700 taken along line B-B of FIG. 7B when the braking apparatus 100 is in the braking configuration and the ball bearing 114 is within one of the bearing grooves 116 while the wheel is rotated in the reverse direction 125. When the ball bearing 114 is in the forward braking position as shown in FIG. 8A and the wheel 102 is rotated in reverse 125, the ball bearing 114 falls through the bearing channel 134 into a bearing groove 116. As the wheel is rotated, the ball bearing 114 is carried within the bearing groove 116 until it becomes interposed between the second bearing wall 126 and the second bearing barrier 122.

Figure 9A:
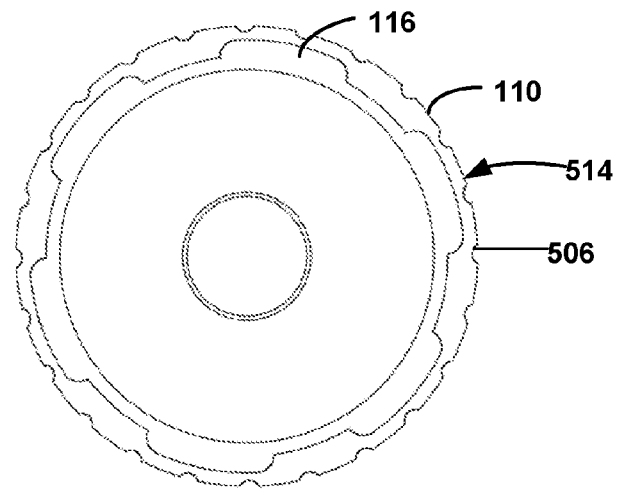
FIG. 9A is an illustration of a side view of an inner portion of the hub interface component in an example where the hub interface component forms a clutch mechanism with features of the wheel hub when installed in the wheel hub.
Figure 9B:
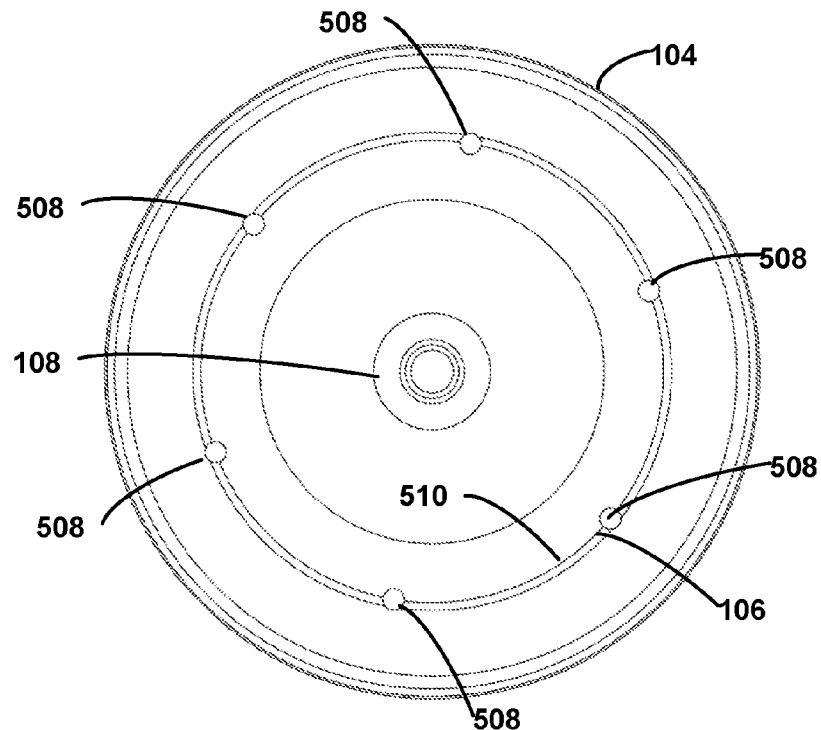
FIG. 9B is an illustration of a side view of the side of the wheel hub for engaging the hub interface component.
Figure 9C:
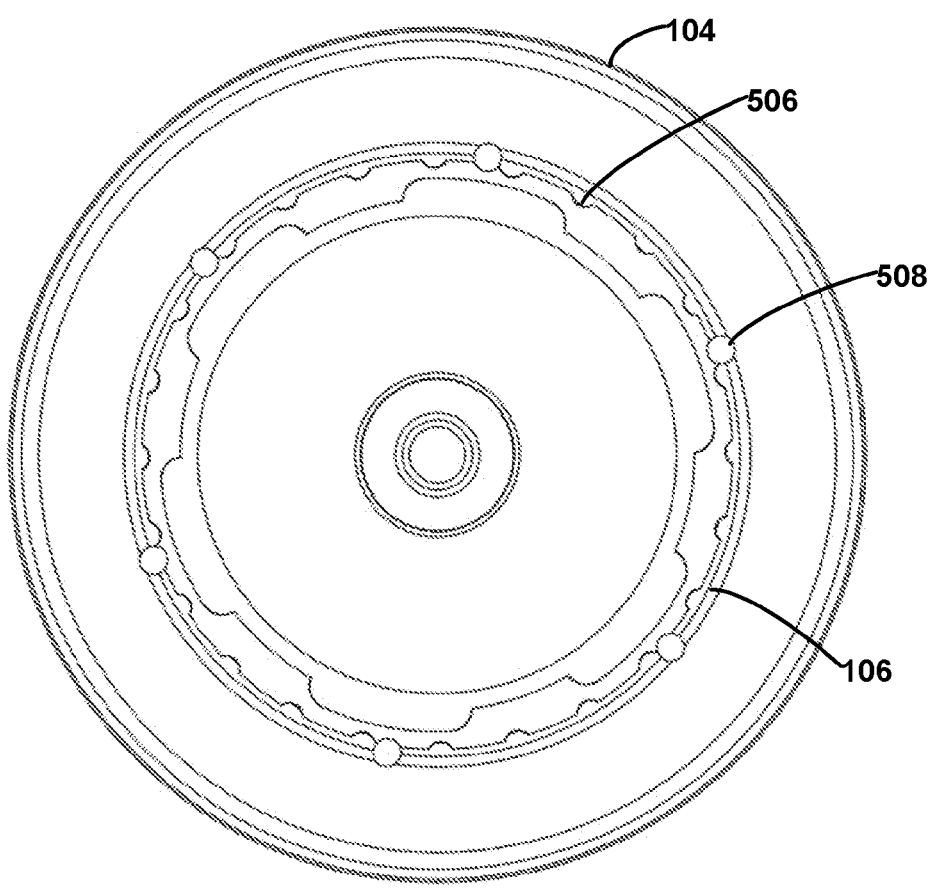
FIG. 9C is an illustration of the hub interface component inserted into the wheel hub to form the clutch mechanism.

FIG. 9A, FIG. 9B and FIG. 9C are illustrations of an example of clutch mechanism formed by the hub interface component 110 and the wheel hub 106. FIG. 9A is an illustration of the hub interface component 110 in an example where the hub interface component 110 forms a clutch mechanism with features of the wheel hub 106 when installed in the wheel hub 106. FIG. 9A is an illustration of a side view of an inner portion of the hub interface component 110. FIG. 9B is an illustration of a side view of the side of the wheel hub for engaging the hub interface component. FIG. 9C is an illustration of the hub interface component 110 inserted into the wheel hub 106 to form the clutch mechanism.

In the exemplary embodiment, the hub interface component 110 is a circular, concave unit that fits within the wheel hub 106 such that an outer surface 514 of the hub interface component 110 engages an inner surface 510 of the wheel hub 106. The wheel bearing in the wheel hub fits within an opening within the hub interface component 110.

For this example, the hub interface component 110 includes six bearing grooves 116 separated by non-grooved portions of the hub interface component 110. The hub interface component 110 has a size and shape that allows the outer surface 514 of the hub interface component to interface to, or otherwise engage, the inner surface 510 of the wheel hub 106. As explained above, in some circumstances, the clutch mechanism may be omitted and the hub interface component 110 is securely fastened to the wheel hub. In this example, however, the outer surface 510 of the hub interface component includes a plurality of indentations or recesses 506 that engage protruding features 508 on the inner surface 510 of the wheel hub. The number of indentations 506 and the spacing between indentations 506 depends on the particular implementation. An example of suitable configuration includes 30 to 50 indentations that are equally spaced. The number and dimensions of indentations, as well as the spacing between indentations, are selected to provide a desired resistance to rotation relative to the wheel hub when the hub interface component is held in the braking position and a force is applied to the wheel. The characteristics of the indentations are also related to the materials used for the wheel hub, protruding features, and the hub interface component as well as the number of protruding features of the wheel hub. Although FIG. 9B and FIG. 9C show six protruding features 508, any number may be used as long as the desired resistance to rotation is achieved.

An example of suitable implementation of the protruding features 508 includes inserting dowels into holes drilled into the wheel hub. The dowels may be made from any of several materials providing at least the appropriate flexibility, strength, durability, and friction. Examples of suitable materials include aluminum, steel, nylon, high density plastics. In some circumstances, the protruding features may be part of the wheel hub and may be formed when the wheel hub is formed. For example, the wheel hub may formed by an injection mold process where the mold includes recesses to form the protruding features 508.

The clutch mechanism may be implemented in different ways. In some circumstances, for example, the outer surface of the hub interface component includes the protruding features and the inner surface of the wheel hub includes the indentations. In other circumstances, the indentations and protruding features are omitted and the hub interface component and the wheel hub have shapes and sizes such that a force fit is formed between the hub interface component and the wheel hub to provide adequate friction between the two components to restriction rotation between the two components until the torque threshold is reached.

Figure 10:
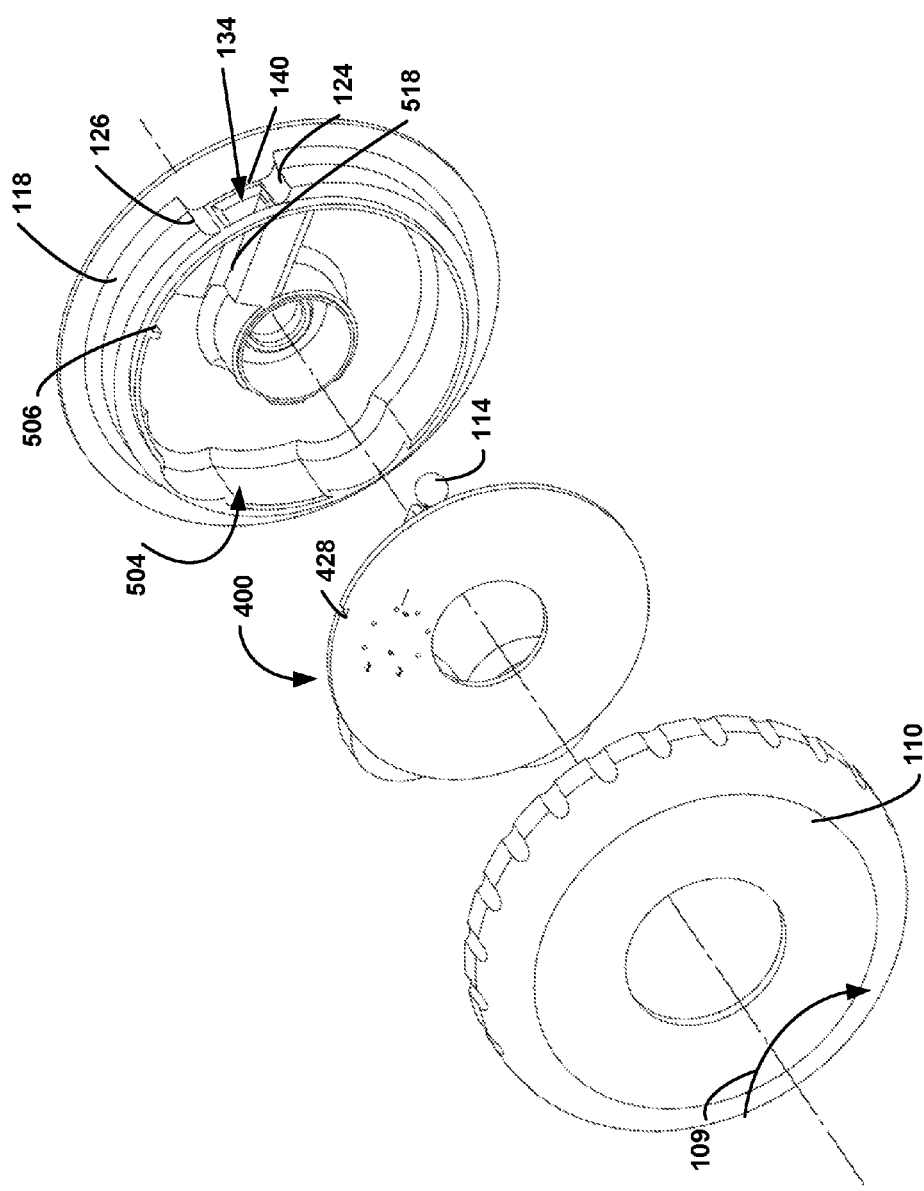
FIG. 10 is an illustration of an exploded view of the wheel and braking apparatus in accordance with the second exemplary embodiment where the ball bearing is at least partially moved by magnetic force to the non-braking position.

FIG. 10 is an illustration of an exploded view of the wheel 102 and braking apparatus 100 in accordance with the second exemplary embodiment where the ball bearing is at least partially moved by magnetic force to the non-braking position. For reference, the arrow (109) indicates the forward wheel rotation 109. The exterior of the non-rotating housing 304 for this example is as described with reference to FIG. 3, FIG. 5A and FIG. 5B. The outer portion 502 of the non-rotating housing 304, therefore, includes the yoke recess 310 to engage the yoke and the inner portion 504 of the non-rotating housing includes features that at least partially form the bearing channel 134. The electric motor 202 and electronics 136 are mounted on a circular printed circuit board 206 which fits within and aligns within the non-rotating housing 304 such that the threaded block 204 is aligned at the opening 140 to the bearing channel 134. The tab 506 on inner portion 504 of the non-rotating housing 304 fits within the notch 424 in the PCB 206 to align the components. When assembled, the wheel bearing 108 of the wheel hub 106 fits within the hole 402 within PCB 206 and an opening within the hub interface component 110.

The hub interface component 110 fits within the wheel hub 106 such that protruding features 508 on the inner surface 510 of the wheel hub 106 engage recesses 512 on the outer surface 514 of the hub interface component 110. The hub interface component 110 is discussed in further detail below with reference to FIG. 11.

The bearing channel 134 is formed by portions of the non-rotating housing 304 and the PCB 206 in the example embodiment. Features 518 form three sides of the rectangular channel and an adjacent portion of the PCB 206 forms the fourth side. The bearing channel 134, however, may be formed in different ways. For example, the entire bearing channel may be formed within the non-rotating housing 304. Such a configuration may be desired in implementations where restricting contact of the ball bearing 114 with the PCB 206 is desired or where the PCB 206 does not extend to the region adjacent to the bearing channel features 518 in the non-rotating housing 304.

The bearing channel 134 in this example extends laterally and perpendicular to the direction of gravity. The bearing wall 118 differs from the example of FIG. 5B in that the bearing wall sides 124, 126 in this example are closer to each other and are positioned at the opening 140 to the bearing channel such that the bearing channel 134 is positioned in between the two bearing wall sides 124, 126. The threaded block travels within the three sides of the bearing channel 134 formed by the non-rotating component housing and the PCB 206. For this example, gravity does not move the ball bearing 114 from the non-braking position to the braking position and the ball bearing is moved to a region between the two sides 124, 126 of the bearing wall 118 when the thread block is extended. Although the ball bearing 114 is magnetic in the second exemplary embodiments, the threaded block or other components may be magnetic in some situations.

Figure 11:
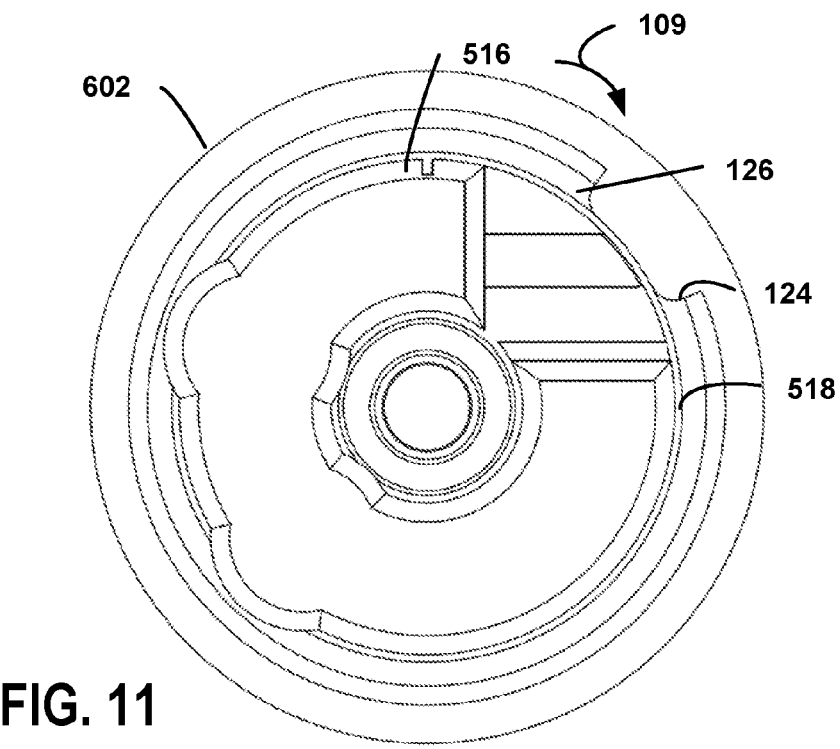
FIG. 11 is an illustration of a side view of the inner portion of the non-rotating component housing for the example where the ball bearing is moved to the non-braking position with magnetic force.

FIG. 11 is an illustration of a side view of the inner portion 504 of the non-rotating component housing 304 for the example where the ball bearing is moved to the non-braking position with magnetic force. As discussed above, the non-rotating housing 304 is a single unit made of molded plastic such as shatter resistant Polypropylene, Polyethylene, Acrylonitrile Butadiene Styrene (ABS) in the exemplary embodiments. The bearing channel is formed by plastic walls 518 that extend from the opening 140 to the bearing release mechanism and includes a section configured to allow the threaded block to move through the bearing channel. The bearing wall 118 is part of the non-rotating housing 304 in the example. The non-rotating housing 304 can be formed using other techniques and may include multiple parts made from different materials.

The non-rotating housing 304 has a bearing guide flange 602 as in the example discussed with reference to FIG. 6A. When the braking assembly is assembled, an edge of the hub interface component 110 rotates against the bearing guide flange 602. When the ball bearing 114 is one of the bearing grooves 116, therefore, the bearing guide flange 602 encloses the ball bearing 114 between the hub interface component 110 and the bearing guide flange 602.

Figure 12:
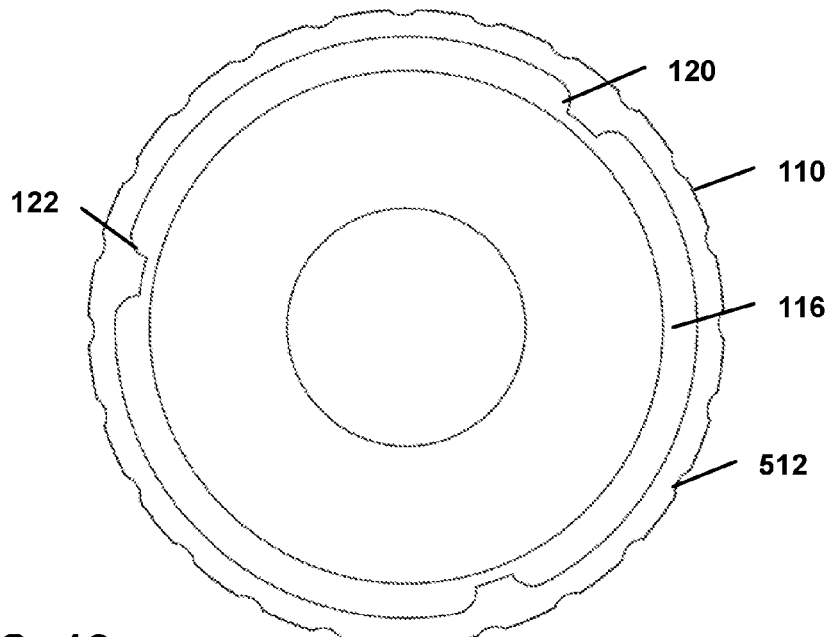
FIG. 12 is an illustration of a side view of the hub interface component where the hub interface component includes three bearing grooves.

FIG. 12 is an illustration of a side view of the hub interface component 110 where the hub interface component 110 includes three bearing grooves 116. For the examples where magnetic force is used to move the ball bearing 114, the hub interface component 110 includes three bearing grooves 116. As described above, the number and size of the bearing grooves depends on the particular implementation. A larger number of bearing grooves results in less travel distance between forward and reverse locking positions of the wheel. Larger numbers of bearing grooves also results in greater likelihood that a feature of the hub interface component 110 other than the bearing groove will interfere with the ball bearing when the threaded block is extended in the breaking configuration.

Figure 13A:
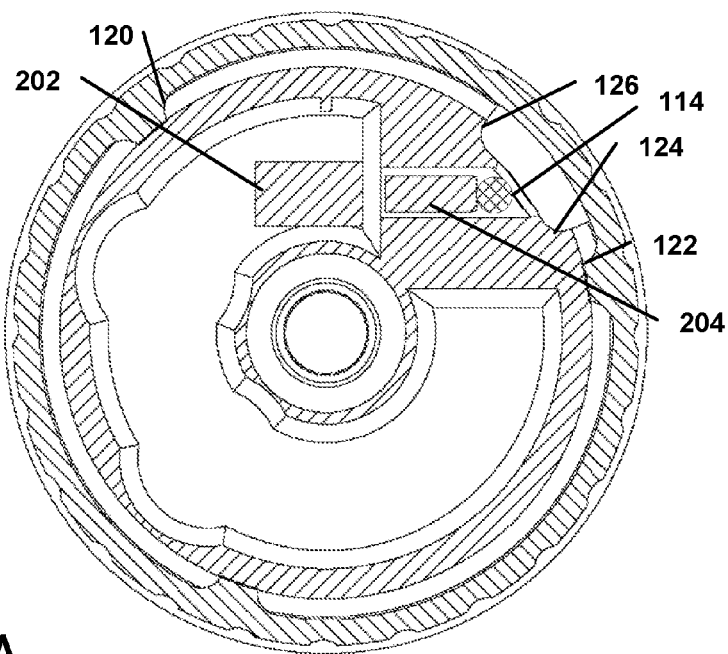
FIG. 13A is an illustration of a cross sectional side view of the braking assembly 700 taken along line B-B of FIG. 7B when the braking apparatus is in the non-braking configuration in accordance with the second exemplary embodiments.
Figure 13B:
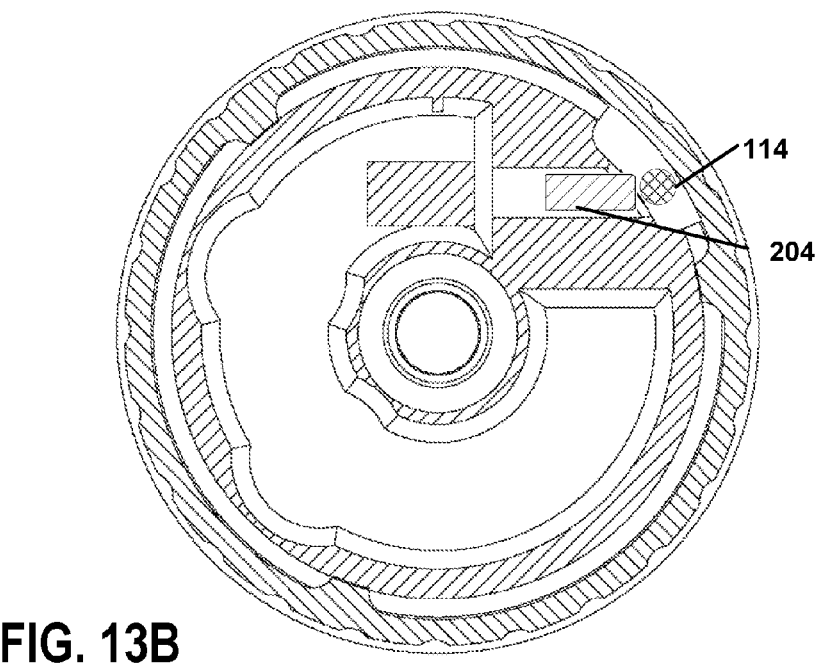
FIG. 13B is an illustration of a cross sectional side view of the braking assembly 700 taken along line B-B of FIG. 7B as the braking apparatus is configured to the braking configuration in accordance with the second exemplary embodiments.

FIG. 13A and FIG. 13B are illustrations in accordance with the second exemplary embodiments and, therefore, illustrate the movement of the components for the examples where the movement of the ball bearing 114 to the non-braking position is at least partially due to magnetic force. FIG. 13A is an illustration of a cross sectional side view of the braking assembly 700 taken along line B-B of FIG. 7B when the braking apparatus 100 is in the non-braking configuration. In accordance with the second exemplary embodiments, the ball bearing 114 is magnetic and the threaded block includes at least a portion that is made from a magnetically attractive material such as stainless steel. The threaded block may be made from other ferrous metal alloys. In some circumstances, the material of the threaded block may not be magnetically attractive and magnetically attractive material is, connected to, injected into, inserted into, or otherwise attached to the threaded block. For example, the threaded block may be made from a plastic such as Delrin® available from DuPont™. Such a material has several desirable properties such as a relatively high hardness and low coefficient of friction. Since the material is not magnetically attractive, however, a ferrous metal feature can be embedded or connected to the threaded block. In the non-braking configuration, the threaded block is in the retracted position and the ball bearing 114 is in contact with the threaded block. The magnetic force between the ball bearing and the threaded block maintains the ball bearing in contact with the threaded block and does not allow the ball bearing to travel to the region between a bearing groove and the sides 124, 126 of the bearing wall. The hub interface component rotates freely relative to the non-rotating component (non-rotating housing).

FIG. 13B is an illustration of a cross sectional side view of the braking assembly 700 taken along line B-B of FIG. 7B when the braking apparatus 100 is entering the braking configuration and the threaded block is in the extended position. The threaded block 204 is moved by the motor 202 to the extended position. Rotating the threaded shaft within the threaded block 204 moves the threaded block 204 through the bearing channel 134 pushing the ball bearing 114 through the bearing channel 134 into one of the bearing grooves 116. Depending on the rotation of the wheel 102, the ball bearing 114 eventually becomes interposed in either the forward braking position or the reverse braking position. The ball bearing 114 is shown in a position prior to one of the bearing barriers 120, 122 of the bearing groove 116 engaging the ball bearing 114. As the wheel is rotated, the hub interface component rotates and one of the sides (120, 123) of one of the bearing grooves 116 contacts the ball bearing 114. The ball bearing is pulled from the threaded block as the hub interface component continues to rotate since the force of the hub interface component exceeds the magnetic force between the threaded block and the ball bearing 114. The hub interface component continues to rotate until the ball bearing is interposed between a bearing barrier (bearing groove side) and a side 122, 124 of the bearing wall 118. The threaded block remains extended in the braking configuration. If the wheel is rotated in the opposite direction, the ball bearing is interposed between the other side of the bearing groove the other side of bearing wall 118.

Figure 14:
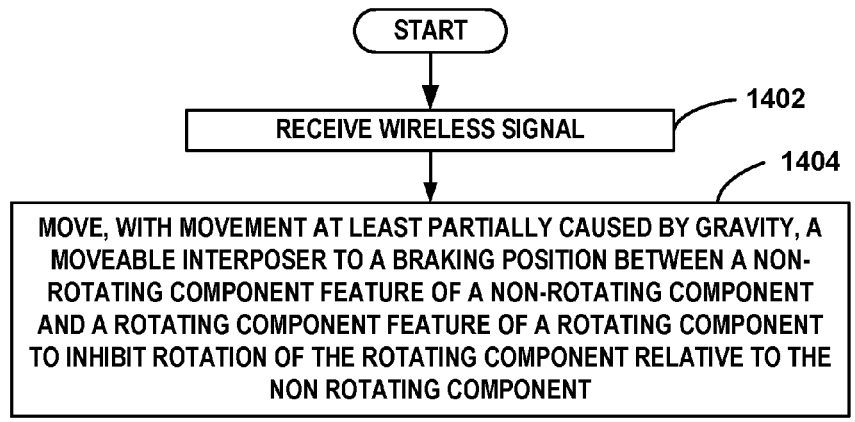
FIG. 14 is a flow chart of a method of inhibiting rotation of a rotating component in accordance with the first exemplary embodiments.

FIG. 14 is a flow chart of a method of inhibiting rotation of a rotating component in accordance with the first exemplary embodiments. The method may be performed with any of numerous devices having structures in accordance with the structures described above.

At step 1402, a wireless signal is received. The receiver 212 receives the wireless signal through the antenna 214. In the exemplary embodiment, if the signal is a low frequency signal such as 8 KHz signal, the wireless signal is received through an iron core inductor 424 and if the wireless signal is a higher frequency signal such as a 2.4 GHz signal, the wireless signal is received through a conductive trace antenna 426.

At step 1404, the moveable interposer is moved where the movement is at least partially caused by gravity. The moveable interposer is moved to the braking position between the non-rotating component feature of the non-rotating component and the rotating component feature of the rotating component to inhibit rotation of the rotating component relative to the non rotating component. Although the moveable interposer may be moved in response to other events, the braking is invoked in response to receipt of the wireless signal in exemplary embodiment. For the example discussed herein, the moveable interposer is a ball bearing, the rotating component feature is a bearing groove, and the non-rotating component feature is a bearing wall. The ball bearing is released from a non-braking position to allow the ball bearing to travel to the bearing groove and be moved within the bearing groove by rotation of the rotating component until the ball bearing is interposed between a wall of the bearing groove and the bearing wall. The movement of the ball bearing is at least partially caused by rotation of the rotating component in this example. The bearing can be released using any of several techniques. In the exemplary embodiment, an electrical motor is activated to move a threaded block which allows the call bearing to fall through a bearing channel to the bearing groove. Therefore, the moveable interposer is moved at least partially by an actuator. Other mechanical actuators can be used such as solenoids, magnets, rotating springs, scissor arms, and springs, for example.

Figure 15:
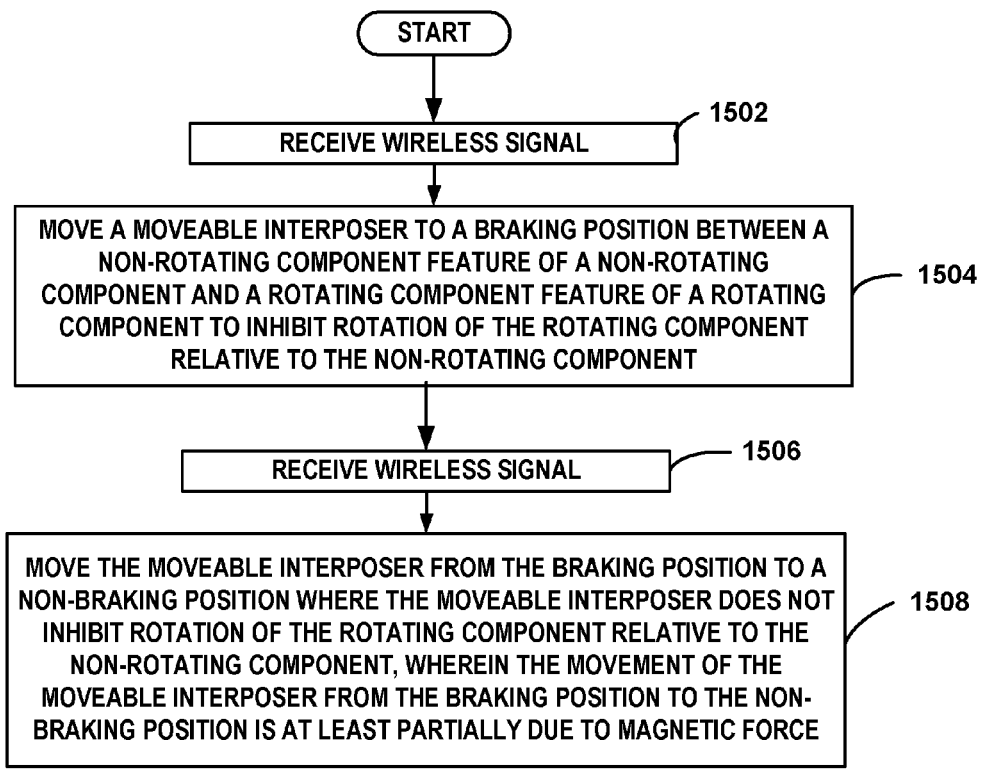
FIG. 15 is a flow chart of a method of inhibiting rotation of a rotating component in accordance with the second exemplary embodiments.

FIG. 15 is a flow chart of a method of inhibiting rotation of a rotating component in accordance with the second exemplary embodiments. The method may be performed with any of numerous devices having structures in accordance with the structures described above.

At step 1502, a wireless signal is received. The receiver 212 receives the wireless signal through the antenna 214. In the exemplary embodiment, if the signal is a low frequency signal such as 8 KHz signal, the wireless signal is received through an iron core inductor 424 and if the wireless signal is a higher frequency signal such as a 2.4 GHz signal, the wireless signal is received through a conductive trace antenna 426. The wireless signal indicates to the controller that the braking apparatus should be placed in the braking configuration.

At step 1504, the moveable interposer is moved to a braking position between a non-rotating component feature of a non-rotating component and a rotating component feature of a rotating component to inhibit rotation of the rotating component relative to the non-rotating component. In accordance with the second exemplary embodiments, a mechanical actuator 142 such as threaded block connected to an electric motor is activated in response to the wireless signal and pushes the magnetic ball bearing 114 through the bearing channel 134 to a position where bearing groove 116 can break the magnetic bond between the ball bearing and the mechanical actuator. The side of the bearing groove moves the ball bearing until the ball bearing is interposed between the side of the bearing groove and the bearing wall of the non-rotating component. Once the ball bearing is lodged between the bearing groove and the bearing wall, the rotating component cannot rotate relative to the non-rotating component.

At step 1506, another wireless signal is received. The receiver 212 receives the wireless signal through the antenna 214. In the exemplary embodiments, if the signal is a low frequency signal such as 8 KHz signal, the wireless signal is received through an iron core inductor 424 and if the wireless signal is a higher frequency signal such as a 2.4 GHz signal, the wireless signal is received through a conductive trace antenna 426. The wireless signal indicates to the controller that the braking apparatus should be placed in the non-braking configuration.

At step 1508, the moveable interposer is moved from the braking position to a non-braking position. In the non-braking position, the moveable interposer does not inhibit rotation of the rotating component relative to the non-rotating component. In accordance with the second exemplary embodiments, the movement of the moveable interposer from the braking position to the non-braking position is at least partially due to magnetic force. In accordance with the second exemplary embodiments, the moveable interposer is moved to the non-braking position by moving the mechanical actuator that is magnetically attractive to the moveable interposer. In response to the other wireless signal, the controller 210 actives the electric motor 202 to move the threaded block 204 to the recessed position. The threaded block is either made from a magnetically attractive material or includes a magnetically attractive component 144. The magnetic ball bearing is attracted to the threaded block 204 and moves to a position outside of the bearing groove 116 allowing rotating component to rotate relative to the non-rotating component. The ball bearing 114, therefore, is pulled by magnetic force from the region between the bearing wall and the side of the bearing groove.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A shopping cart wheel comprising:
    a non-rotating component;
    a rotating component configured to rotate relative to the non-rotating component when the shopping cart wheel is in a non-braking configuration and configured not to rotate relative to the non-rotating component when the shopping cart wheel is in a braking configuration;
    a low frequency antenna;
    a high frequency antenna;
    a low frequency receiver electrically connected to the low frequency antenna and configured to receive one or more low frequency signals through the low frequency antenna;
    a high frequency receiver electrically connected to the high frequency antenna and configured to receive one or more high frequency wireless signals;

a controller connected to the low frequency receiver and the high frequency receiver, the controller configured to place the shopping cart wheel in the braking configuration and the non-braking configuration in response to the one or more low frequency signals and the one or more high frequency signals;

a wheel hub; and a clutch mechanism between the rotating component and the wheel hub, the clutch mechanism providing resistance between the wheel hub and the rotating component such that the wheel hub can rotate relative to the rotating component only when a force between the wheel hub and the rotating component exceeds the resistance.

2. The shopping cart wheel of claim 1, further wherein the controller is configured to determine a state of the shopping cart wheel and, based on the state and a received wireless signal, to generate a first control signal to place the shopping cart wheel in the braking configuration and a second control signal to place the shopping cart wheel in the non-braking configuration.

3. The shopping cart wheel of claim 1, wherein the controller is configured to:

place the shopping cart wheel in the braking configuration in response to the low frequency receiver receiving a first low frequency wireless signal;

place the shopping cart wheel in the non-braking configuration in response to the low frequency receiver receiving a second low frequency wireless signal;

place the shopping cart wheel in the braking configuration in response to the high frequency receiver receiving a first high frequency signal wireless signal; and place the shopping cart wheel in the non-braking configuration in response to the high frequency receiver receiving a second high frequency wireless signal.

4. The shopping cart wheel of claim 1, wherein a frequency of the first low frequency signal and a frequency of the second low frequency signal are less than 9 KHz.

5. The shopping cart wheel of claim 4, wherein the frequency of the first low frequency signal and the frequency of the second low frequency signal are about 8 KHz.

6. The shopping cart wheel of claim 1, wherein a frequency of the first high frequency signal and a frequency of the second high frequency signal are greater than 2.3 GHz.

7. The shopping cart wheel of claim 6, wherein the frequency of the first high frequency signal and the frequency of the second high frequency signal are about 2.4 GHz.

8. The shopping cart wheel of claim 1, wherein the clutch mechanism is at least partially formed by:

a plurality of recesses disposed on at least one of an inner surface of the wheel hub and an outer surface of the rotating component; and a plurality of protruding features disposed on at least one of the inner surface of the wheel hub and the outer surface of the rotating component.

9. The shopping cart wheel of claim 8, wherein:

the rotating component is a hub interface component positioned within the wheel hub and configured to engage the inner surface of the wheel hub; and the clutch mechanism is at least partially formed by a plurality of recesses disposed on an outer surface of the hub interface component and a plurality of protruding features disposed on the inner surface of the wheel hub.

10. The shopping cart wheel of claim 9, wherein a number of protruding features, a number of recesses, a shape of the recesses, and a shape of the protruding features are selected to create friction resulting in the resistance between the rotating component of the wheel hub such that the wheel hub will rotate relative to the non-rotating feature when the shopping cart wheel is in the braking configuration and the shopping cart wheel is pushed along a surface without dragging on the surface.

11. The shopping cart wheel of claim 10, wherein a material of the protruding features is selected to create the friction between the rotating component and the wheel hub such that the wheel hub will rotate relative to the non-rotating feature when the shopping cart wheel is in the braking configuration and the shopping cart wheel is pushed along a surface without dragging on the surface.

12. The shopping cart wheel of claim 1, wherein the rotating component comprises a wall and the non-rotating component comprises a non-rotating component feature and where the shopping cart wheel is in the braking configuration at least when a moveable interposer is positioned in a braking position where the moveable interposer is between the wall and the non-rotating component feature, the shopping cart wheel further comprising a release mechanism configured to release, the moveable interposer from a non-braking position to allow the moveable interposer to move to the braking position, the electronics configured to actuate the release mechanism to release the moveable interposer in response to detection of a wireless signal.

13. A shopping cart wheel comprising:

a non-rotating component;

a rotating component configured to rotate relative to the non-rotating component unless the shopping cart wheel is in a braking configuration;

electronics configured to place the shopping cart wheel in the non-braking configuration in response to a wireless signal received within a first frequency band defined by an Institute of Electrical and Electronics Engineers (IEEE) 802.11 standard, the electronics configured to place the shopping cart wheel in the braking configuration in response to an electromagnetic signal received within a second frequency band lower than the first frequency band;

a wheel hub; and a clutch mechanism formed by a wheel hub surface of the wheel hub and a rotating component surface of the rotating component, the clutch mechanism providing resistance between the wheel hub and the rotating component such that the wheel hub can rotate relative to the rotating component only when a force between the wheel hub and the rotating component exceeds the resistance.

14. The shopping cart wheel of claim 13, wherein the electronics are configured to place the shopping cart wheel in the braking configuration in response to another wireless signal received within the first frequency band and to place the shopping cart wheel in the non-braking configuration in response to another electromagnetic signal received within the second frequency band.

15. The shopping cart wheel of claim 14, wherein the first frequency band includes 2.4 GHz and the second frequency band includes 8 KHz.

16. The shopping cart wheel of claim 14, wherein the rotating component comprises a wall and the non-rotating component comprises a non-rotating component feature and where the shopping cart wheel is in the braking configuration at least when a moveable interposer is positioned in a braking position where the moveable interposer is between the wall and the non-rotating component feature, the shopping cart wheel further comprising a release mechanism configured to release, the moveable interposer from a non-braking position to allow the moveable interposer to move to the braking position, the electronics configured to actuate the release mechanism to release the moveable interposer in response to detection of at least one of the electromagnetic signal and the another wireless signal.

17. The shopping cart wheel of claim 16, wherein the clutch mechanism is at least partially formed by:
   a plurality of recesses disposed on at least one of the wheel hub surface and the rotating component surface; and
   a plurality of protruding features disposed on at least one of the wheel hub surface and the rotating component surface.

18. The shopping cart wheel of claim 16, wherein the moveable interposer moves to the braking position at least partially due to gravity and at least partially due to rotation of the rotating feature.

19. The shopping cart wheel of claim 18, wherein a number of protruding features, a number of recesses, a shape of the recesses, and a shape of the protruding features are selected to create friction between the rotating component and the wheel hub such that the wheel hub will rotate relative to the non-rotating feature when the shopping cart wheel is in the braking configuration and the shopping cart wheel is pushed along a surface without dragging on the surface.

20. The shopping cart wheel of claim 18, wherein a material of the protruding features is selected to create a friction between the rotating component and the wheel hub such that the wheel hub will rotate relative to the non-rotating feature when the shopping cart wheel is in the braking configuration and the shopping cart wheel is pushed along a surface without dragging on the surface.

* * * * *